(12) United States Patent
Karamcheti

(10) Patent No.: US 8,225,006 B1
(45) Date of Patent: Jul. 17, 2012

(54) METHODS FOR DATA REDUNDANCY ACROSS THREE OR MORE STORAGE DEVICES

(75) Inventor: Vijay Karamcheti, Los Altos, CA (US)

(73) Assignee: Virident Systems, Inc., Milpitas, CA (US)

( * ) Notice: Subject to any disclaimer, the term of this patent is extended or adjusted under 35 U.S.C. 154(b) by 0 days.

(21) Appl. No.: 13/163,273

(22) Filed: Jun. 17, 2011

Related U.S. Application Data

(60) Continuation-in-part of application No. 12/831,233, filed on Jul. 6, 2010, and a continuation-in-part of application No. 12/369,725, filed on Feb. 11, 2009, and a division of application No. 11/847,986, filed on Aug. 30, 2007, now Pat. No. 7,761,623.

(60) Provisional application No. 61/356,651, filed on Jun. 20, 2010, provisional application No. 61/356,640, filed on Jun. 20, 2010, provisional application No. 61/356,480, filed on Jun. 18, 2010.

(51) Int. Cl.
*G06F 3/00* (2006.01)
(52) U.S. Cl. ............... 710/5; 710/74; 711/114; 714/6.2; 714/6.21; 714/6.22; 714/6.23
(58) Field of Classification Search .......................... None
See application file for complete search history.

(56) References Cited

U.S. PATENT DOCUMENTS

| | | | |
|---|---|---|---|
| 2006/0085674 A1* | 4/2006 | Ananthamurthy | 714/6 |
| 2009/0144497 A1* | 6/2009 | Withers | 711/114 |
| 2009/0172335 A1* | 7/2009 | Kulkarni et al. | 711/170 |

OTHER PUBLICATIONS

Mogi et al., "Dynamic Parity Stripe Reorganizations for RAID5 Disk Arrays," 1994, IEEE, pp. 17-26.*

* cited by examiner

*Primary Examiner* — Eron J Sorrell
(74) *Attorney, Agent, or Firm* — Alford Law Group, Inc.; William E. Alford

(57) ABSTRACT

In one embodiment of the invention, a method for data redundancy across three or more storage devices is disclosed. The method includes storing a collection of data chunks as a plurality of N-1 data stripes across N storage devices where N is three or more, wherein each data chunk of up to N data chunks forming a data stripe is stored in a different storage device; storing a parity stripe across the N storage devices including N-1 data parity chunks and one meta data parity chunk; wherein each Kth storage device of N-1 storage devices stores a Kth data parity chunk of the N-1 data parity chunks computed as parity of up to N data chunks forming the Kth data stripe; and wherein an Nth storage device of the N storage devices stores the meta parity chunk computed as parity of the N-1 data parity chunks stored in the respective N-1 storage devices.

25 Claims, 23 Drawing Sheets

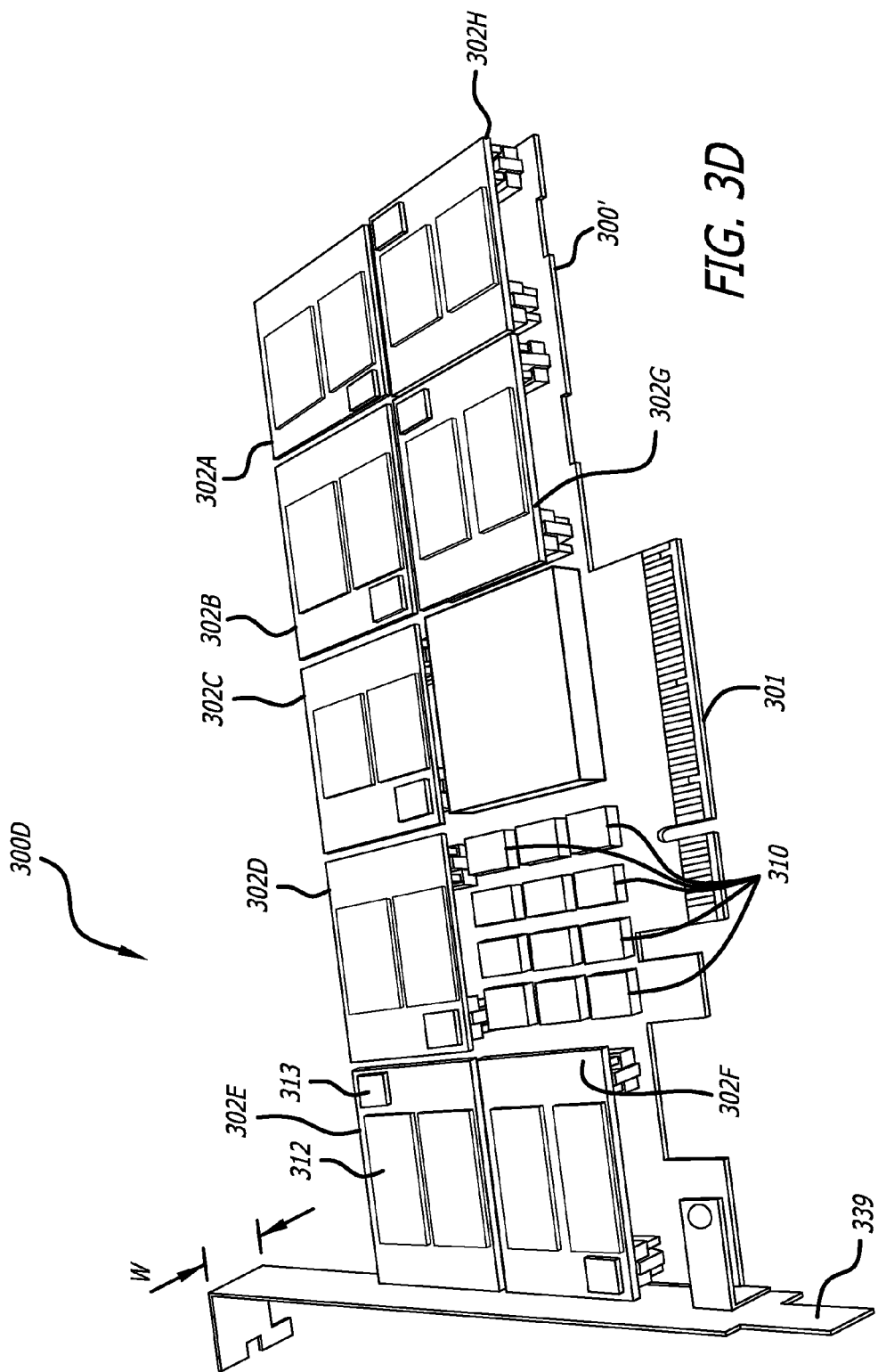

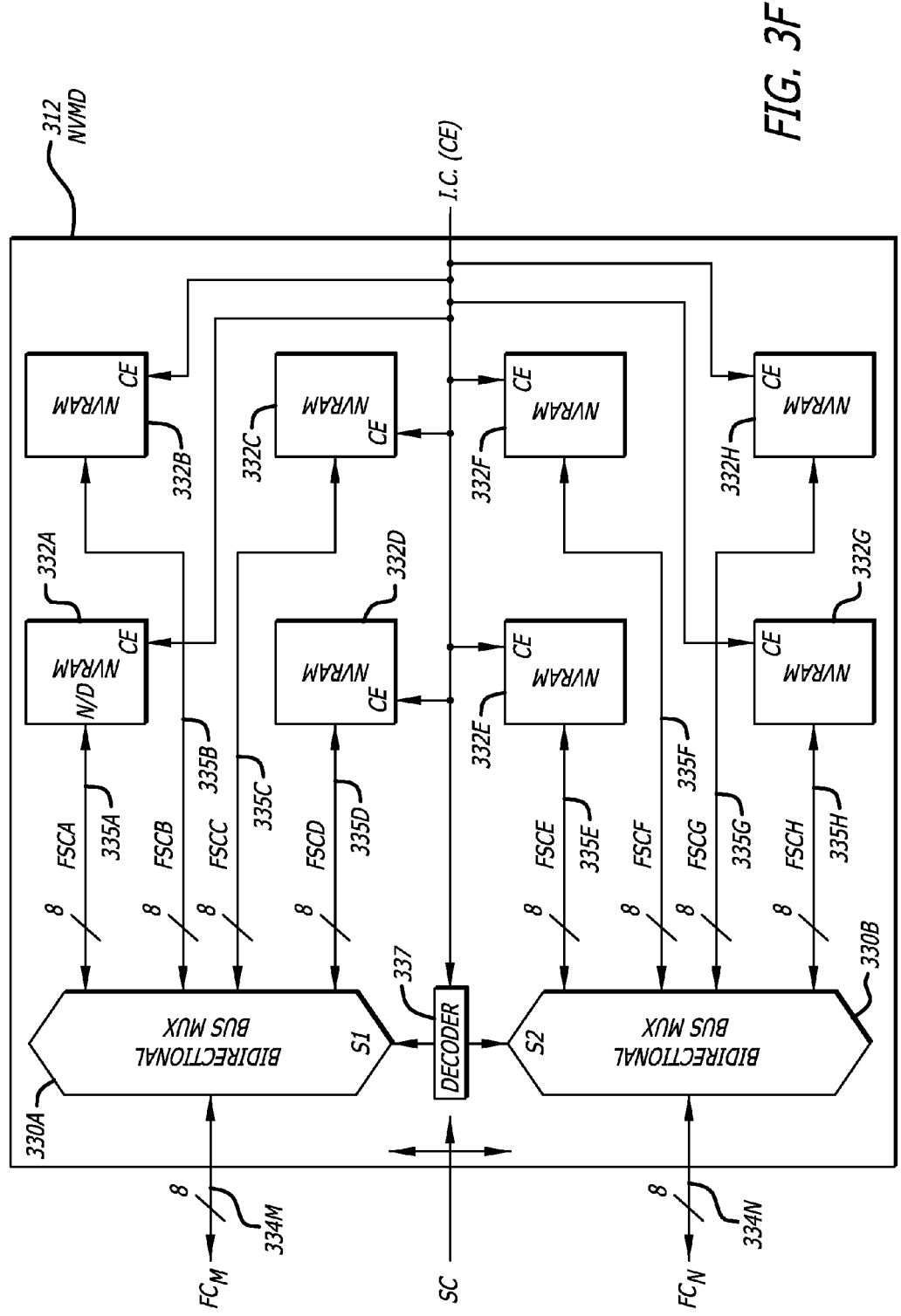

601

| DC ID | NVMD ID | Bad Blocks | Program Erase Count | Correctable Error No. | Write Op Latency | Erase Op Latency | Program Error Count | Erase Error Count |
|---|---|---|---|---|---|---|---|---|
| DC 0 | NVMD 0 | 10 | 1536 | 205 | 287 | 1050 | 5 | 5 |
| DC 0 | NVMD 1 | 15 | 1530 | 257 | 312 | 1104 | 7 | 8 |
| DC 0 | NVMD 2 | 12 | 1529 | 126 | 334 | 997 | 5 | 7 |
| DC 0 | NVMD 3 | 20 | 1540 | 114 | 318 | 1078 | 12 | 8 |
| ... | | | | | | | | |
| DC N-1 | NVMD N-1 | BB | PEC | CEN | WOL | EOL | PWC | EWC |

| Th Bad Blocks | Th Program Erase Count | Th Correctable Error No. | Th Write Op Latency | Th Erase Op Latency | Th Program Error Count | Th Erase Error Count |
|---|---|---|---|---|---|---|
| 400 | 100000 | 10000 | 500 | 1500 | 200 | 200 |

*FIG. 6B*

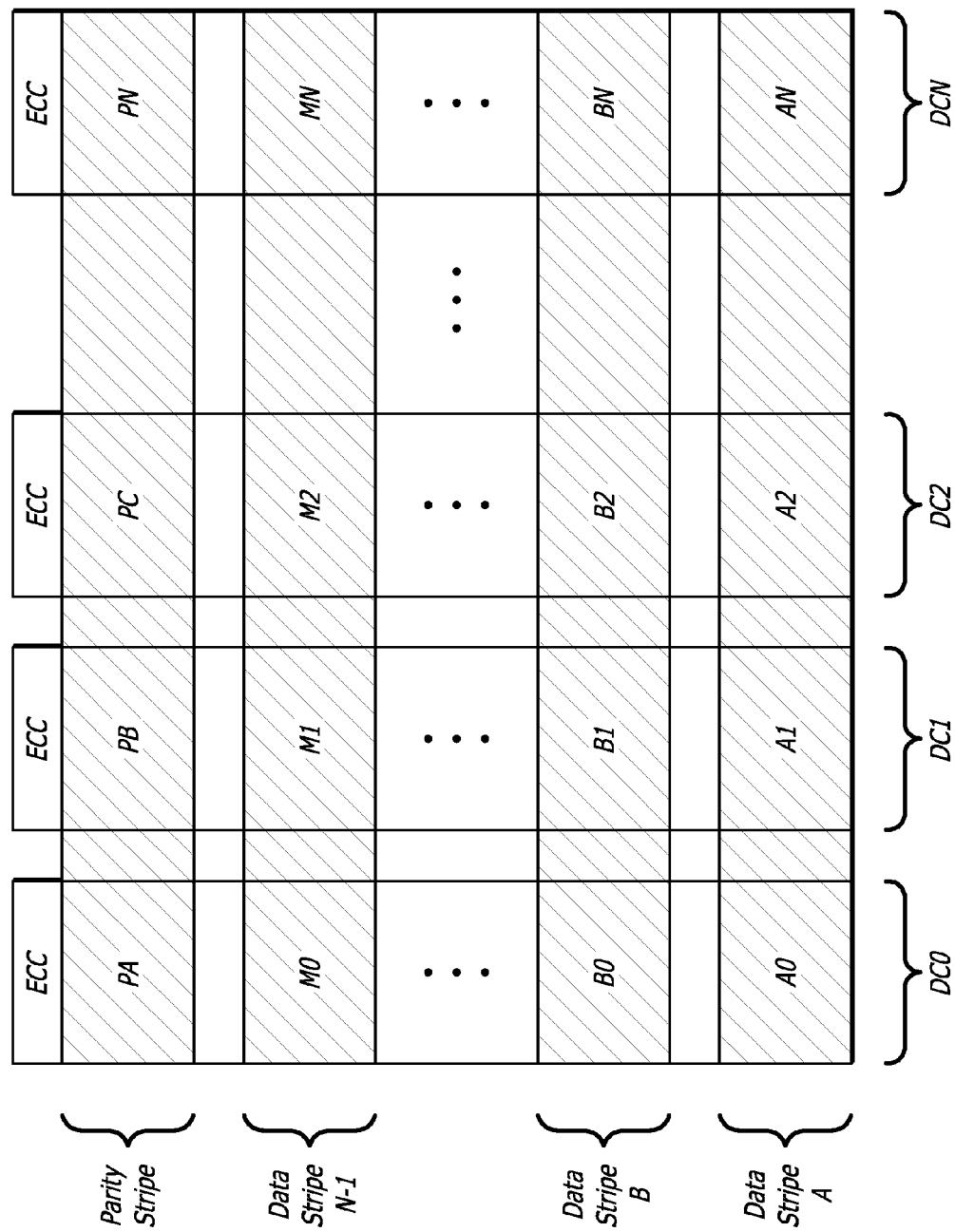

METHODS FOR DATA REDUNDANCY ACROSS THREE OR MORE STORAGE DEVICES

CROSS-REFERENCE TO RELATED APPLICATIONS

This United States (U.S.) patent application claims the benefit of U.S. Patent Application No. 61/356,480 entitled METHODS FOR DATA REDUNDANCY ACROSS THREE OR MORE STORAGE DEVICES filed on Jun. 18, 2010 by inventor Vijay Karamcheti, U.S. Patent Application No. 61/356,651 entitled SUSTAINED READ AND WRITE PERFORMANCE FOR NON-VOLATILE MEMORY filed on Jun. 20, 2010 by inventors Vijay Karamcheti et al., and U.S. Patent Application No. 61/356,640 entitled MEMORY APPARATUS AND METHODS THEREOF FOR EARLY WRITE TERMINATION AND POWER FAILURE filed on Jun. 20, 2010 by inventors Vijay Karamcheti et al., and is a continuation in part claiming the benefit of U.S. patent application Ser. No. 12/831,233 entitled SYSTEM AND APPARATUS WITH A MEMORY CONTROLLER CONFIGURED TO CONTROL ACCESS TO RANDOMLY ACCESSIBLE NON-VOLATILE MEMORY filed on Jul. 6, 2010 by inventors Vijay Karamcheti et al., pending, and U.S. patent application Ser. No. 12/369,725 entitled METHODS AND APPARATUS FOR TWO-DIMENSIONAL MAIN MEMORY filed on Feb. 11, 2009 by inventors Vijay Karamcheti et al., pending, all of which are incorporated herein by reference in their entirety.

U.S. patent application Ser. No. 12/831,233 is a divisional of U.S. patent application Ser. No. 11/847,986 entitled MAIN MEMORY IN A SYSTEM WITH A MEMORY CONTROLLER CONFIGURED TO CONTROL ACCESS TO NON-VOLATILE MEMORY, AND RELATED TECHNOLOGIES filed on Aug. 30, 2007 by inventors Vijay Karamcheti et al., now issued as U.S. Pat. No. 7,761,623.

FIELD

The embodiments of the invention relate generally to redundant arrays of independent disks (RAID).

BACKGROUND

Computer systems often include dynamic random access memory (DRAM) integrated circuits (ICs) and magnetic storage disks as part of their read/writeable storage subsystem. DRAM supports high-performance random access at small block granularity (e.g., 8 bit bytes), but is limited in its capacity, consumes power, and is volatile (i.e., information stored there is lost if power goes out). On the other hand, magnetic storage disks have larger capacity and are non-volatile, but deliver poor data access performance.

Consequently, the overall performance of a single server with DRAM and hard disks is limited, requiring multiple servers and higher operating costs to meet the performance demands of application workloads.

It is desirable to reduce server count and operating costs by increasing the performance of a single server by providing alternatives to DRAM and magnetic disks in the read/writeable storage subsystem of computer systems.

BRIEF SUMMARY

Aspects of embodiments of the invention are summarized by the claims that follow below.

BRIEF DESCRIPTIONS OF THE DRAWINGS

FIG. 3D is a perspective view of a pluggable server memory card with a single level of replaceable pluggable daughter-memory-cards.

FIG. 3F is a block diagram of a non-volatile memory device that may be mounted to a replaceable pluggable daughter-memory-card.

FIGS. 6A-6B illustrate a diagram of tables of data that may be stored in a non-volatile card configuration device of the pluggable server storage card.

FIG. 8B illustrates a diagram of how N daughter-memory-cards may be used to provide redundant data storage in a server memory card.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The technologies used by non-volatile memory integrated circuits differ from dynamic random access memory (DRAM) integrated circuits (ICs) in the structure of their memory cell and in how they store information within the cell. These differences may help a computer system achieve relatively low power consumption characteristics. For example, non-volatile memory integrated circuits typically do not require refresh cycles and thus conserve power. Non-volatile memory integrated circuits, because of their increased density and high read and write performance, may help expand the capacity of main memory in the system. Alternately or in addition, non-volatile memory integrated circuits, by virtue of their ability to persist information across power cycling of the computer system, may help improve the I/O performance of disk-based storage systems.

Non-volatile memory integrated circuits possess characteristics that allow them to augment, and in some cases replace DRAM and storage disks in a storage subsystem of a computer system. Some types of non-volatile memory circuits, such as NAND Flash integrated circuits, can be configured as storage devices that offer disk-like non-volatility and capacity, with DRAM-like read and write access performance. Delivering the same performance, some types of non-volatile memory circuits may utilize less space and consume less power.

Typically, read and write accesses to non-volatile memory integrated circuits may take more time than corresponding accesses to DRAM integrated circuits. In order to address differences between read and write performance and the access characteristics, a data communication protocol may be used that accesses the non-volatile memory modules in a different manner than DRAM memory modules. Data may be first loaded into a DRAM staging area before being written into some types of non-volatile memory and accessed by application software running on the processing unit of the computer system. Some types of non-volatile memory may also have data stored into the DRAM staging area before being written in block form into the non-volatile memory integrated circuits.

Low Power Server System

Figure 1:
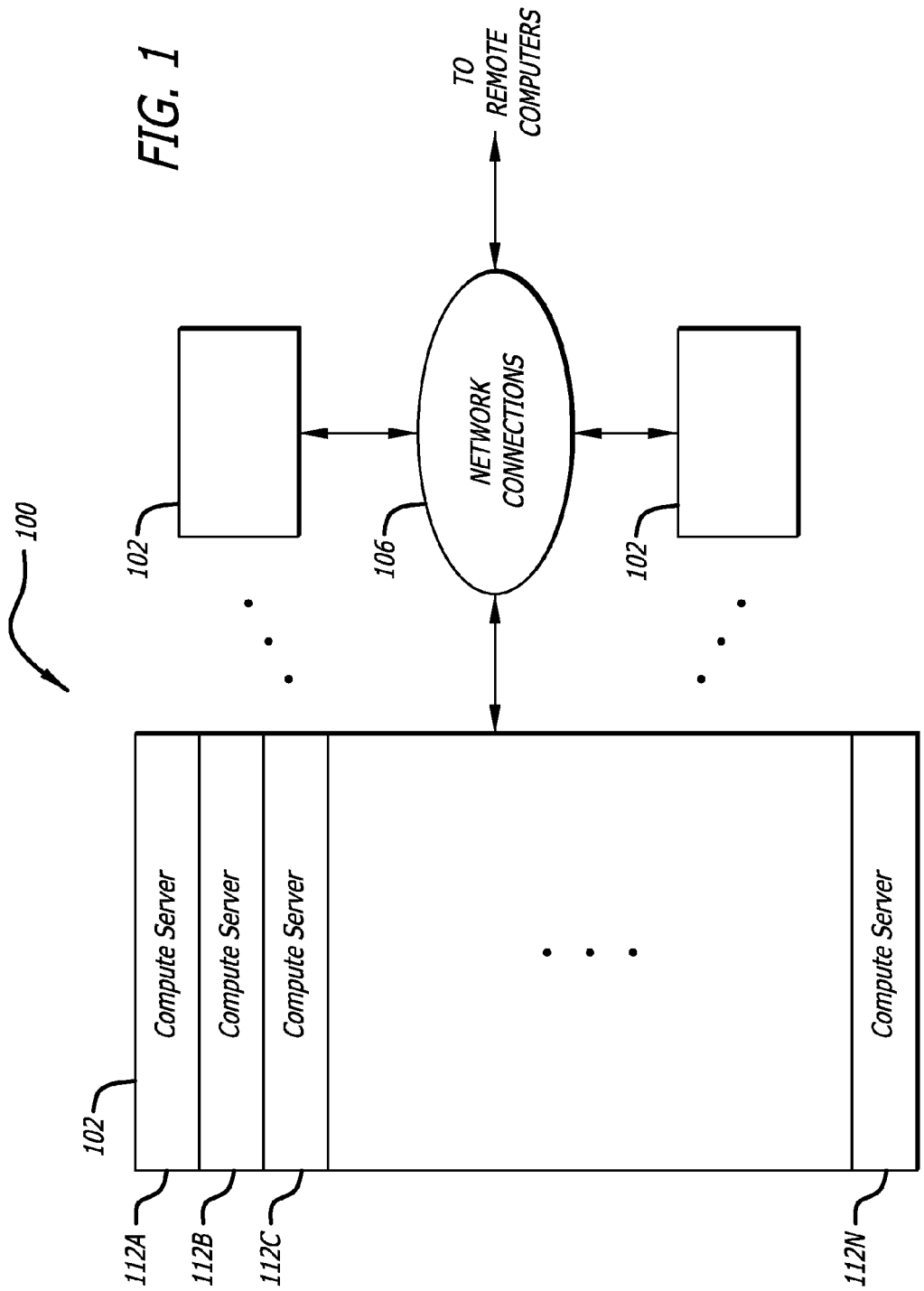
FIG. 1 is a block diagram of a server center.

Referring now to FIG. 1, a block diagram of a server system 100 is illustrated including one or more low power server racks 102 coupled to a wide area network (e.g., internet) or local area network through network connections 106. The server system 100 may couple to remote computers through the network connections. The low power server rack 102 includes one or more low power compute servers 112A-112N each of which can store and process data in a low power main memory incorporating non-volatile memory devices.

With additional servers being made available on the internet to provide web based applications and web based storage and searches, a lower power server rack incorporating non-volatile memory devices may lower power consumption and reduce operating costs of a server system.

Figure 2A:
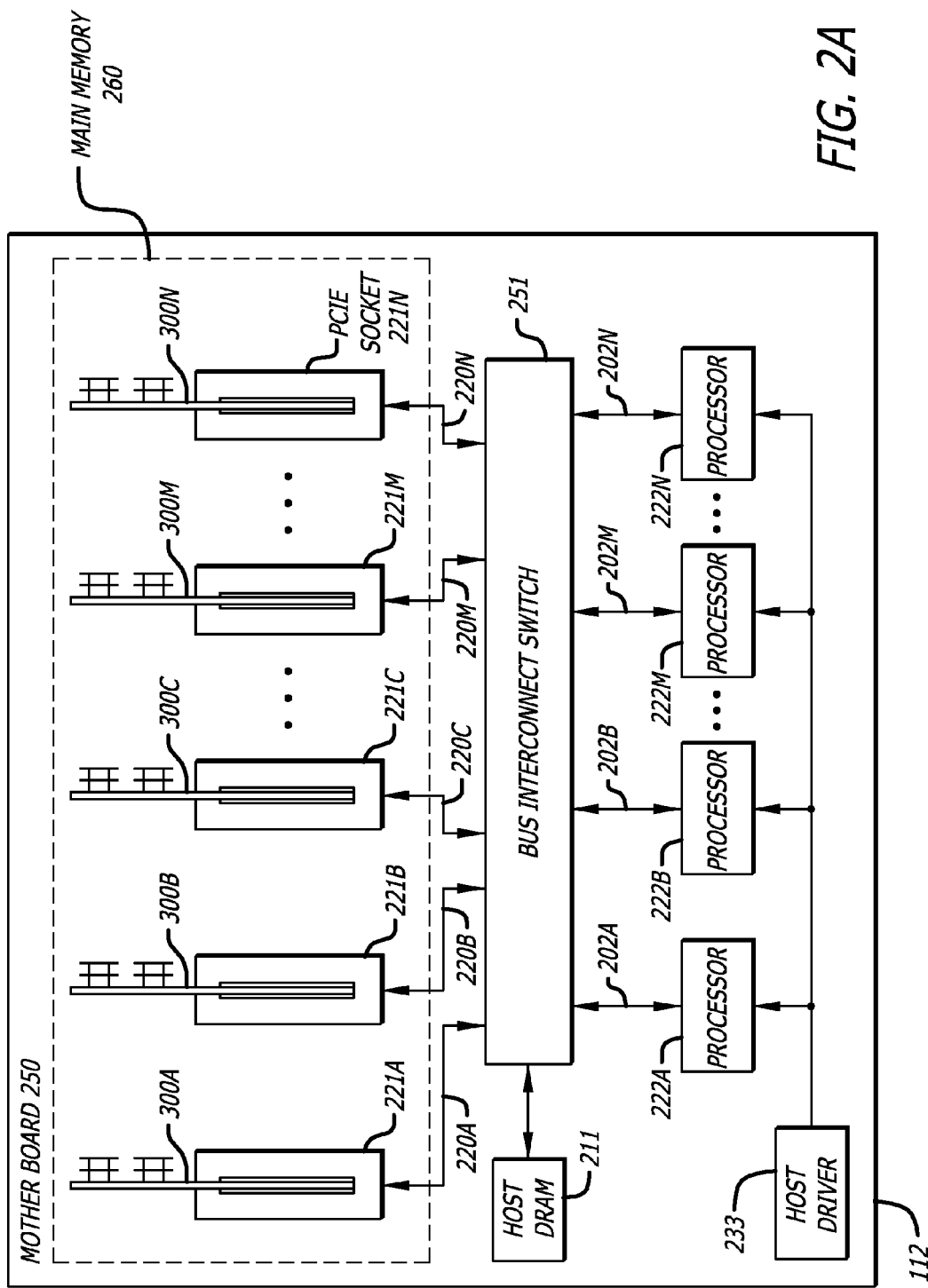
FIG. 2A is a block diagram of a server system.
Figure 2B:
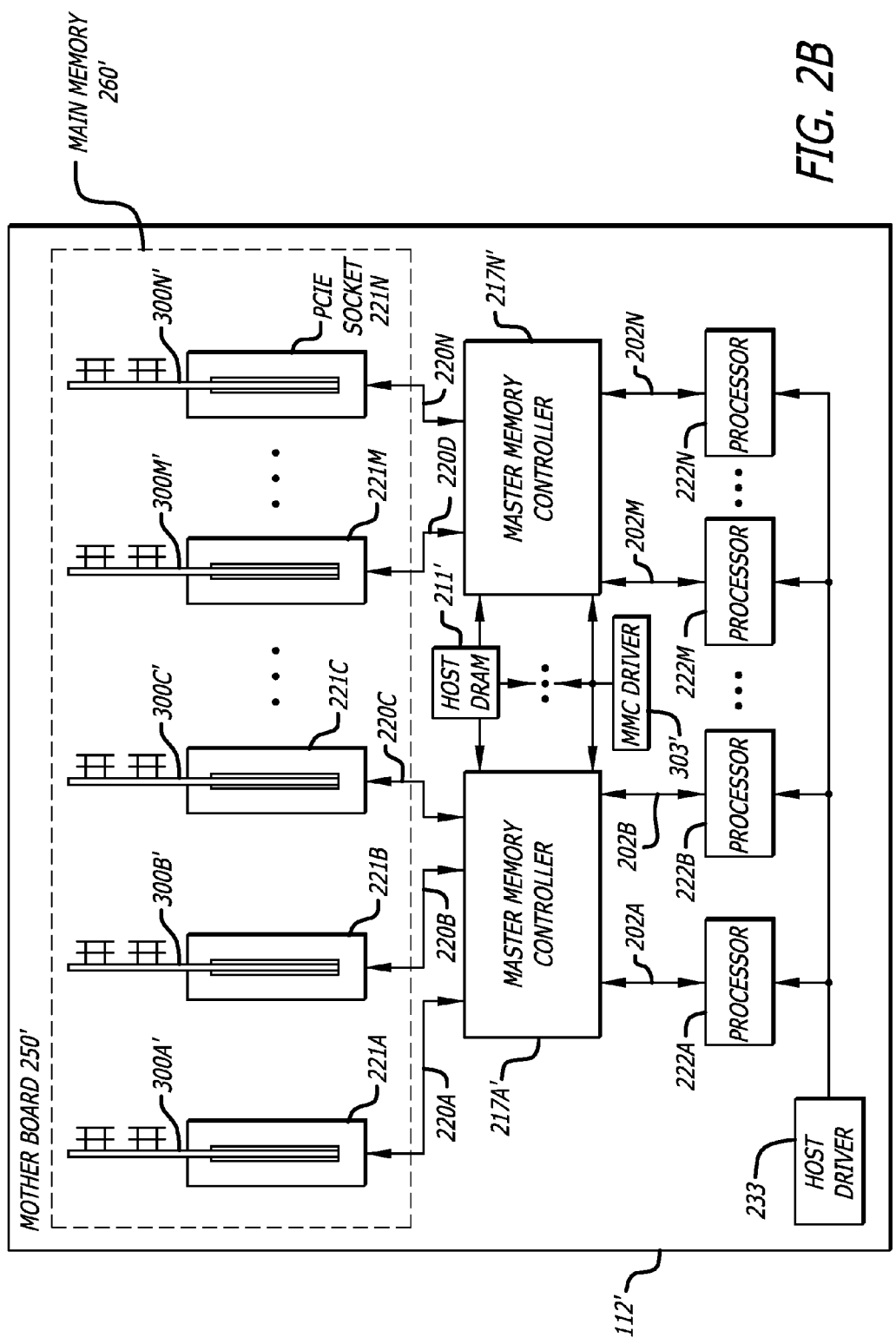
FIG. 2B is a block diagram of an alternate server system.

Referring now to FIG. 2A, a block diagram of a low power compute server 112 is illustrated as an instance of one of the low power compute servers 112A-112N of the server rack. FIG. 2B, illustrates a block diagram of an alternate low power compute server 112' as an instance of one of the low power compute servers 112A-112N of the server rack.

The compute server 112,112' includes a main memory 260,260' with one or more replaceable low power server memory cards (SMC) 300A-300N,300A'-300N' each having non-volatile random access memory (NVRAM). A server memory card (SMC) may also be referred to as a slot card memory (SCM). NVRAM that is randomly accessible and can be re-written and erased, in contrast to read only memory (ROM) that can only be read and not re-written, may generally be referred to herein as non-volatile memory. When implemented with NAND flash memory, the NVRAM is block accessible using a block based flash memory interface.

The compute server 112,112' includes a multilayer mother printed circuit board 250,250' (also referred to as a "mother board") with one or more layers of wire interconnect or traces, such as traces 202A-202N and 220A-220N, to connect components of the server in communication with each other as shown. The traces of the motherboard connect the various processors, memory, and I/O together on the motherboard. To receive an edge connector of each of the one or more replaceable low power server memory cards (SMC) 300A-300N, 300A'-300N', the motherboard 250,250' includes one or more expansion connectors or sockets 221A-221N. In one embodiment of the invention, the edge connector of the server memory cards (SMC) 300A-300N,300A'-300N' is a peripheral component interconnect express (PCIe) edge connector and each of the sockets 221A-221N is a PCIe socket.

The compute server 112,112' may be a multiprocessor server with a plurality of processors 222A-222N mounted to the mother board 250 each of which may be in communication with a host software driver that may be stored in a storage device 233. In the compute server 112 illustrated in FIG. 2A, memory controllers (master memory controllers 217,217' and slave memory controllers 402A-402B shown in FIG. 4) are included as part of the server memory cards 300A-300N. However, the compute server 112' illustrated in FIG. 2B may include one or more master memory controllers 217A'-217N' mounted to the mother board and coupled to the plurality of processors 222A-222N by traces 202A-202N and a host dynamic random access memory (DRAM) 211' by additional printed circuit board traces. The memory controllers 217A'-217N' couple to the sockets 221A-221N by the traces 220A-220N that may be referred to as primary or master memory channels 220A-220N. The memory controllers 217A'-217N' are primary or master memory controllers to respectively control one or more of the primary or master memory channels 220A-220N. Alternatively, one or more master memory controllers 217,217' may be located on each of the one or more replaceable low power server memory cards (SMC) 300A-300N. A bus interconnect switch 251 illustrated in FIG. 2A may be mounted to the motherboard and coupled to printed circuit board (PCB) traces 220A-220N,202A-202N between the one or more processors 222A-222N and each of the sockets 221A-221N. The host dynamic random access memory (DRAM) 211 may be coupled to the PCB traces that are further coupled to the bus interconnect switch 251. Secondary memory controllers or slave memory controllers may couple to the master memory controllers and control each memory channel.

The master memory controllers and/or the slave memory controllers may be software programmable memory controllers that can adapt on the fly, prior to memory access, to different types and capacities of memory. A master memory controller driver 303 (see MMC driver 303' in FIG. 2B) in communication with each of the master memory controllers 217A'-217N' may be used to initialize the memory controllers and execute a number of program instructions to provide support services to each of the server memory cards (SMC) 300A'-300N'. Alternatively, the master memory controller driver 303 may be stored in a read only memory (see ROM 423 in FIG. 4) and communicated to each of the one or more master memory controllers 217,217' to initialize the memory controllers and execute a number of program instructions to provide support services to each of the server memory cards (SMC) 300A-300N shown in FIG. 2A.

Low Power Server Memory Card (SMC)

Figure 3A:
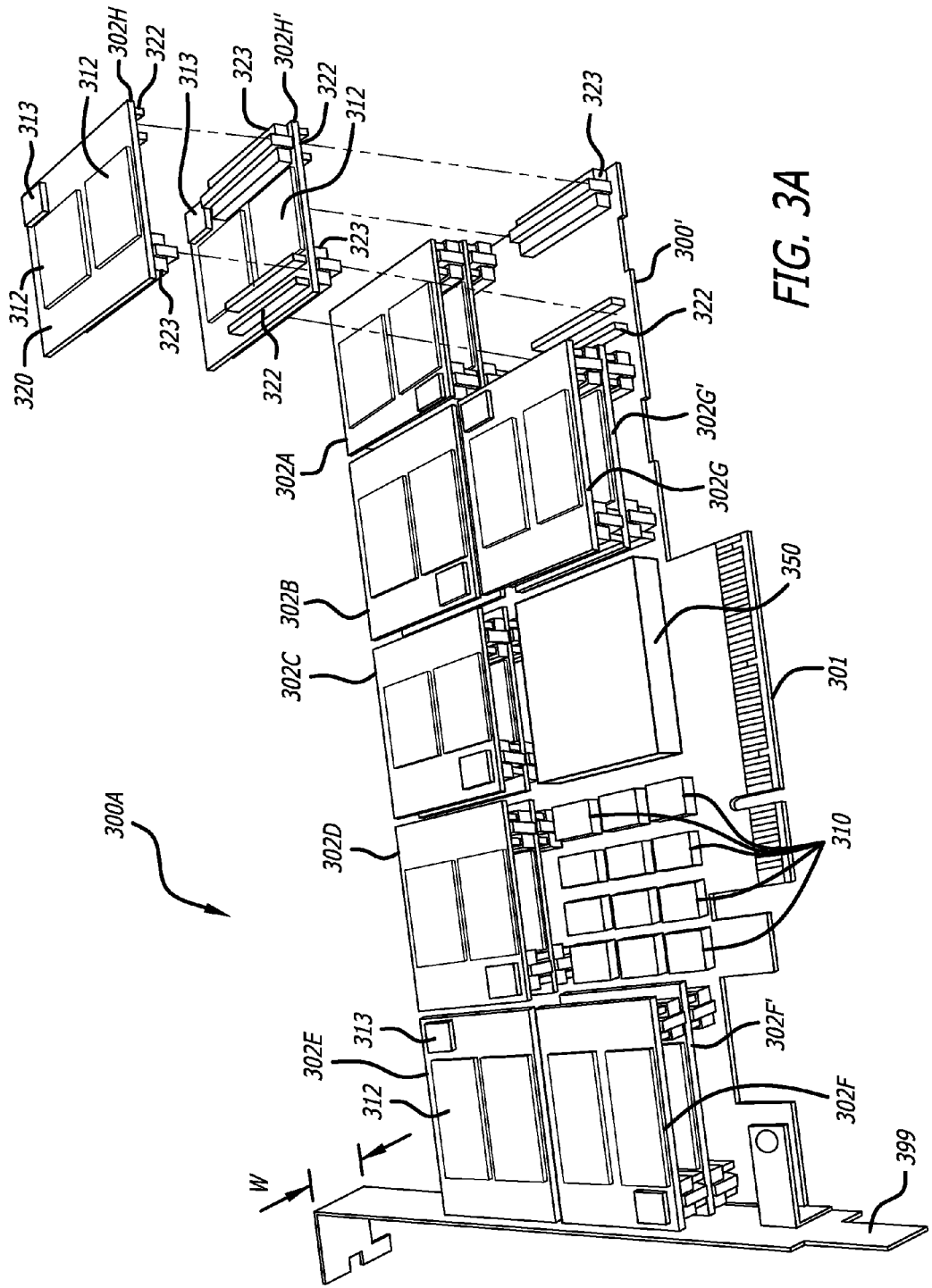
FIG. 3A is a perspective view of a pluggable server memory card with two levels of replaceable pluggable daughter-memory-cards.

Referring now to FIG. 3A, a partially exploded view of an instance of a server memory card 300A is illustrated that may be used for each of the server memory cards (SMC) 300A-300N,300A'-300N' shown in FIGS. 2A-2B.

The server memory card 300A includes a baseboard printed circuit board 300' having a host edge connector 301 and one or more layers of printed circuit board traces. A mounting bracket 399 having a width W is coupled to the baseboard printed circuit board 300'. The mounting bracket 399 may be coupled to a case of the compute server 112,112'. The host edge connector 301 is adapted to couple to the sockets 221A-221N mounted to the motherboard 250 of the host server system.

The server memory card 300A includes one or more master controllers 350 mounted to a side (e.g., top or left side) of the baseboard PCB 300' and one or more slave controllers (see slave controllers 402A-402B in FIG. 4) mounted to a side (e.g., bottom or right side) of the baseboard PCB 300' and coupled to the master controller 350 by a plurality of master-slave memory bus channels. A host bus channel formed of traces of the baseboard printed circuit board 300' may couple the master controllers 217,217' to the host edge connector 301. The one or more slave controllers are adapted to provide transparent access to non-volatile memory. The master controllers and slave controllers provide native access of the non-volatile memory to the processors.

The server memory card 300A further includes a plurality of female daughter-card sockets 322 mounted to the baseboard 300' and respectively coupled to the slave memory controllers by means of the plurality of memory bus channels. The server memory card 300A further includes a plurality of male daughter-card sockets 323 mounted to the baseboard 300' and respectively coupled to the slave memory controllers by means of the plurality of memory bus channels. The daughter-card sockets 322-323 are adapted to receive a plurality of replaceable pluggable daughter memory cards 302A-302H, 302A'-302H'. While male daughter-card sockets 323 and female daughter-card sockets 322 have been described as positioned, they may be interchanged into different combinations including female only daughter-card sockets 322 mounted to the baseboard 300' to receive male only sockets of the daughter card or male only daughter-card sockets 323 mounted to the baseboard 300' to receive female only sockets of the daughter card.

The server memory card 300A further includes one or more of the replaceable pluggable daughter memory cards 302A-302H, 302A'-302H'. Each of the daughter memory cards includes a plurality of packaged non-volatile memory devices 312 mounted to a rectangular printed circuit board. For lower costs, the daughter memory cards avoid having a memory controller such that the flash memory interface of active ones of the plurality of packaged non-volatile memory devices 312 are seen at the connectors 322,323.

The server memory card 300A further includes a non-volatile card configuration device 420 (see FIG. 4) coupled to the one or more master controllers 217,217'. An embedded processor 422 may access the card configuration device 420 through the master controller 217,217' to initialize the server memory card 300. The master controller 217,217' may come out of a reset condition into a minimal functionality mode and access information from the card configuration device to complete initialization and setup of the master controller itself.

The master controllers 217,217' natively control the non-volatile memory devices to obtain predictable bandwidth and latency performance with the non-volatile memory mounted to the daughter-memory-cards. One or more slave controllers are adapted to provide transparent access to non-volatile memory devices 312. All operations that take place on the flash memory device 322 (read, write, erase, plus control operations such as reset, etc.) are completely visible to (and under the control of) the master controller. The flash memory interface of active ones of the plurality of packaged non-volatile memory devices 312 is passed through the slave memory controller to the master controller to which the slave memory controller is coupled.

The master controller is able to directly exercise each of the operations that are supported by the flash memory devices 322. The slave controller may perform protocol conversion, but does not drop/intercept (without involving the flash memory device) a request from the master controller. However, the slave controller does not autonomously initiate any flash memory operation.

In one embodiment of the invention, the plurality of slave controllers 402A-402B (see FIG. 4) are mounted to the baseboard 300' coupled between the master controller 217,217' and the plurality of daughter-card sockets 322-323. In another embodiment of the invention, the plurality of slave controllers are mounted together in an integrated circuit package with the master controller 217,217' and coupled between the master controller 217,217' and the plurality of daughter-card sockets 322-323. In yet another embodiment of the invention, the plurality of slave controllers are mounted to the plurality of daughter-memory-cards 302A-302H, 302A'-302H'coupled between the master controller 217,217' and the plurality of packaged non-volatile memory 312.

Figure 4:
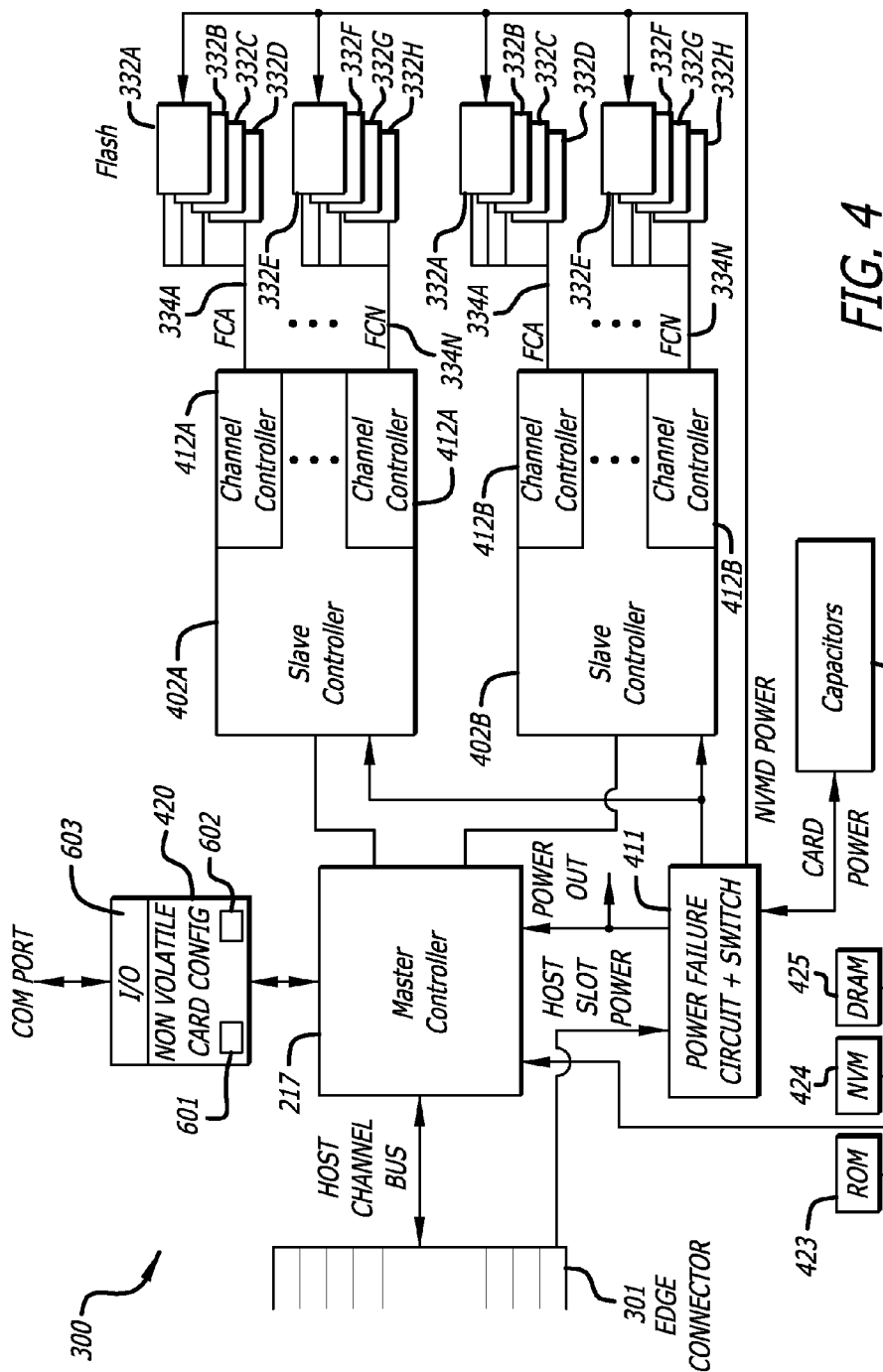
FIG. 4 is a block diagram of a portion of the pluggable server storage card with daughter-memory-cards.

Referring now to FIG. 4, each slave controller 402A-402B is adapted to arbitrate memory bus channels 334A-334N shared by the multiple non-volatile memory devices 312, to buffer and multiplex signals between the master controller 217,217' and the multiple non-volatile memory devices 312, and to combine a sequence of predictable non-volatile memory operations together into a compound operation to improve control bandwidth with the non-volatile memory devices.

Referring now back to FIG. 3A, intermediate daughter-memory-cards 302A'-302H' are removeably plugged into the receptacles 322,323 of the base-board 300'. The intermediate daughter-memory-cards 302A'-302H' include daughter-card sockets 323,322 on top and bottom sides of the rectangular printed circuit board.

Top daughter-memory-cards 302A-302H are respectively removeably plugged into a top-side of the intermediate daughter-memory-cards 302A'-302H'. Signals for the top daughter-memory-cards flow through the intermediate daughter-memory-cards by way of stacked daughter-card sockets 323-323 being plugged together. As discussed herein, each of the daughter memory cards 302A-302H, 302A'-302H' includes a plurality of packaged non-volatile memory devices 312 mounted to a rectangular printed circuit board.

Referring now to FIGS. 3A and 4, the server memory card 300A further includes a plurality of high density power capacitors 310 and power failure circuitry 411 (see FIG. 4) mounted to the baseboard 300' to store card power and switch from host power to card power in the case of power failure. The power failure circuitry 411 is coupled to the edge connector 301 to receive host or slot power and ground. The power failure circuitry 411 is coupled to the plurality of high density power capacitors 310 to receive capacitor power and ground (also referred to as card power). The power failure circuitry 411 further couples to the master controller 217, 217', the plurality of slave controllers 402A-402B, the plurality of daughter-card sockets 323,322 and daughter-memory-cards 302 coupled thereto, and the non-volatile card configuration device 420 in order to provide power (either the slot power or the card power) thereto.

The power failure circuitry 411 detects slot power failure and switches from supplying slot power to provide capacitor or card power to the devices to which it couples. The power failure circuitry 411 further notifies the master controller 217,217' and the plurality of slave controllers 402A-402B to switch into a power failure mode to execute data preservation operations. Upon initial power up of the server memory card, the power failure circuitry charges the plurality of high density power capacitors 310 before the master memory controller 217,217' and the plurality of slave memory controllers 402A-402B permit access to the non-volatile memory devices of the daughter-memory-cards 302. The edge connector 301 of the server memory card may include staggered power pins (Ground pins first, power second) in order to provide hot plugability.

As shown in FIG. 4, each server memory card 300A may further include an embedded processor 422, a read only memory (ROM) 423, a non-volatile memory 424, and a dynamic random access memory (DRAM) 425 mounted to the baseboard 300' and coupled together as shown. The ROM 423 stores boot instructions for the server memory card 300A. The DRAM 425 proves scratch pad memory to the embedded processor 422 and can store translation structures (e.g., a translation table mapping logical addresses to physical addresses) to access data in the non-volatile memory devices 312. The non-volatile memory 424 includes firmware instructions that may be periodically upgraded. The firmware instructions drive and control the master and slave memory controllers 217, 402A-402B to perform read, write, erase or maintenance operations to access data with the non-volatile memory devices 312 of the daughter-memory-cards 302. The embedded processor 422 executes the firmware instructions to drive and control the master and slave memory controllers to access data as well as read, write, and maintain the translation structures in the DRAM.

The embedded processor 422 is further coupled to the master memory controller 217,217' and the edge connector 301 to communicate with each. The embedded processor is also in communication with the host processors 222A-222N over the edge connector to receive read and write operation requests from the host application or host operating system software to access data in the NVMDs.

Referring now back to FIGS. 2A-2B, the server 112,112' includes a host driver stored in a host storage device 233. The host driver stored in the host storage device 233 includes instructions that can be executed by one or more of the host processors 222A-222N that may result in issuing read or write memory requests to one or more server memory cards. In an alternate embodiment, the host driver stored in the host storage device can also directly interact with the master memory controller so that read/write requests can be issued directly.

Daughter Memory Card (DMC)

As discussed herein, the server memory card may include intermediate daughter-memory-cards 302A'-302H' and/or top daughter-memory-cards 302A-302H having male daughter-card sockets 323 and/or female daughter-card sockets 322 and respectively plugged into the female daughter-card sockets 322 and/or male daughter-card sockets 323. The one or more sockets 322,323, mounted to the top or bottom sides of the printed circuit boards near opposite edges, may also be referred to as pluggable electrical connectors. The female socket 322 may also be referred to as a receptacle and the male socket 323 may also be referred to as a plug. The one or more sockets 322,323 may be mounted parallel or perpendicular to the top or bottom sides of the printed circuit boards to make respective connections in parallel with or perpendicular to the edge connector 301.

In FIG. 3A, intermediate daughter-memory-cards 302A'-302H' are removeably plugged into the sockets 322-323 of the base-board 300'. Top daughter-memory-cards 302A-302H are respectively removeably plugged into a top-side of the intermediate daughter-memory-cards 302A'-302H'. A dual level of daughter-memory-cards is used in the server memory card 300A. While only two levels of daughter-memory-cards are shown, additional levels may be added provided the spacing requirements are more relaxed, such as by using a double wide bracket 399 with the base-board 300'. Alternatively, spacing requirements may be more stringent or costs may be a factor, in which case a single level of daughter-memory-cards may be used.

In FIG. 3D, top daughter-memory-cards 302A-302H are removeably plugged into sockets 322-323 of the base-board 300' providing for a single level of daughter-memory-cards being used in the server memory card 300D.

The number of levels of daughter-memory-cards may typically limited by the width W of the bracket 399 setting the spacing requirements from neighboring cards. That is, the overall width of the server memory card may be no greater than the width W of the bracket.

Figure 3B:
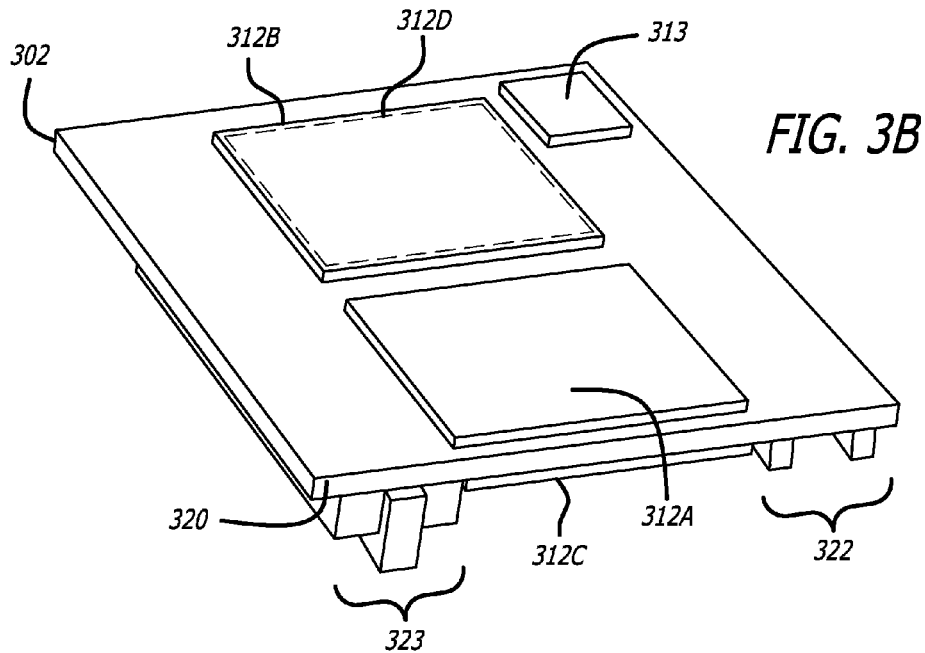
FIG. 3B is a perspective view of an intermediate replaceable pluggable daughter-memory-card.

Referring now to FIG. 3B, a perspective view of a top daughter-memory-card 302 is illustrated that is an instance of each of the top daughter-memory-cards 302A-302H shown in FIGS. 3A and 3D.

The top daughter-memory-card 302 includes a rectangular shaped multilayer printed circuit board 320 with a plurality of non-volatile memory devices 312A-312D (collectively referred to as non-volatile memory devices 312), a support chip 313, a male socket 323, and a female socket 322 mounted thereto. Electrical pins of the male socket 323 and the female socket 322 are coupled to the plurality of non-volatile memory devices 312A-312D by printed circuit board traces of the printed circuit board 320. The male socket 323 and the female socket 322 are mounted perpendicular to the bottom-side of the printed circuit board 320 of the top daughter-memory-card 320. Sockets may not be mounted to a top-side of the printed circuit board 320 of the top daughter-memory-card to reduce costs and meet the width requirement of the server memory card 300A.

Figure 3C:
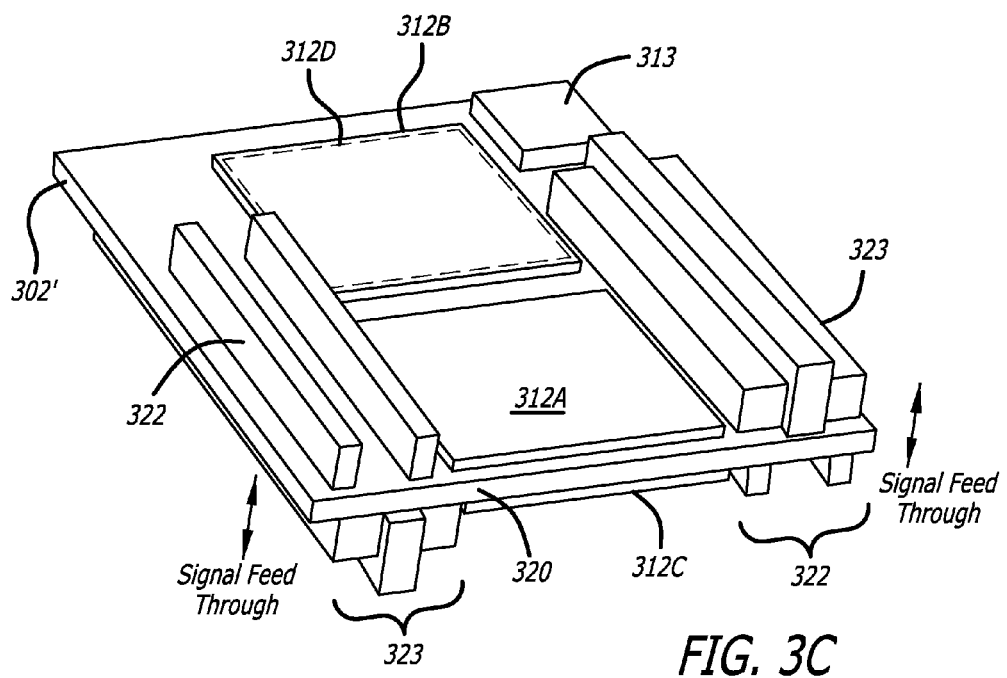
FIG. 3C is a perspective view of a top replaceable pluggable daughter-memory-card.

Referring now to FIG. 3C, a perspective view of an intermediate daughter-memory-card 302' is illustrated that is an instance of each of the intermediate daughter-memory-cards 302A'-302H' shown in FIG. 3A.

The intermediate daughter-memory-card 302', similar to the top daughter-memory-card, includes a rectangular shaped multilayer printed circuit board 320 with a plurality of non-volatile memory devices 312A-312D, a support chip 313, male sockets 323, and female sockets 322 mounted thereto. Electrical pins of the male sockets 323 and the female sockets 322 are coupled to the plurality of non-volatile memory devices 312A-312D by printed circuit board traces of the printed circuit board 320.

The intermediate daughter-memory-cards 302A'-302H' include daughter-card sockets 323-323 mounted perpendicular to both top and bottom sides of the rectangular printed circuit board 320. A female socket 322 may be mounted on the top-side near a left or right side or edge in alignment with a male socket 323 on the bottom-side. Similarly, a male socket 323 may be mounted on the top-side near a right or left side or edge in alignment with a female socket 322 on the bottom-side. The pins of the top sockets are coupled to the pins of the bottom sockets so that signals can flow up or down through the printed circuit board 320. As the gender of the sockets changes from top to bottom, top daughter-memory-cards 302A-302H may be removeably plugged into a top-side of the intermediate daughter-memory-cards 302A'-302H', while the intermediate daughter-memory-cards 302A'-302H' plug into the sockets of the base-board 300'. Signals for the top daughter-memory-cards flow through the intermediate daughter-memory-cards to the base-board by way of stacked daughter-card sockets 323-323 being plugged together.

As discussed previously, each of the daughter memory cards 302A-302H, 302A'-302H' includes a plurality of packaged non-volatile memory devices 312 mounted to a rectangular printed circuit board. In one embodiment of the invention, four non-volatile memory devices 312A-312D are mounted to the printed circuit board 320 of the top daughter-memory-card 302 and/or the intermediate daughter-memory-cards 302'. The non-volatile memory devices 312A-312B may be mounted to the top-side while non-volatile memory devices 312C-312D may be mounted to the bottom-side of the printed circuit board 320. Signal lines on the top-side from the non-volatile memory devices 312A-312B are fed through to the male socket 323 and/or the female socket 322 mounted to the bottom-side of the printed circuit board 320. Signal lines on the bottom-side from the non-volatile memory devices 312C-312D are coupled to the male socket 323 and/or the female socket 322 mounted to the bottom-side of the printed circuit board 320.

On the intermediate daughter-memory-card, the pins of the top sockets are coupled to the pins of the bottom sockets so that signals can flow up or down through the printed circuit board 320. When in a stacked configuration (dual level), signals from the non-volatile memory devices 312A-312D of the top daughter-memory-card 302 are fed up and down through to the male socket 323 and/or the female socket 322 mounted to the bottom-side of the printed circuit board 320 of the intermediate daughter-memory-card 302', as shown by the arrows in FIG. 3C.

In one embodiment of the invention, a portion (e.g., half) of the signals in each connector of a daughter card are for the NVMDs mounted to the bottom side while the remaining portion (e.g., the other half) of the signals are for the NVMDs mounted to the top side. In another embodiment of the invention, signals in connectors of a daughter card on one side of the printed circuit board are for the NVMDs mounted to the bottom side while signals in connectors on the opposite side are for the NVMDs mounted to the top side.

Figure 3E:
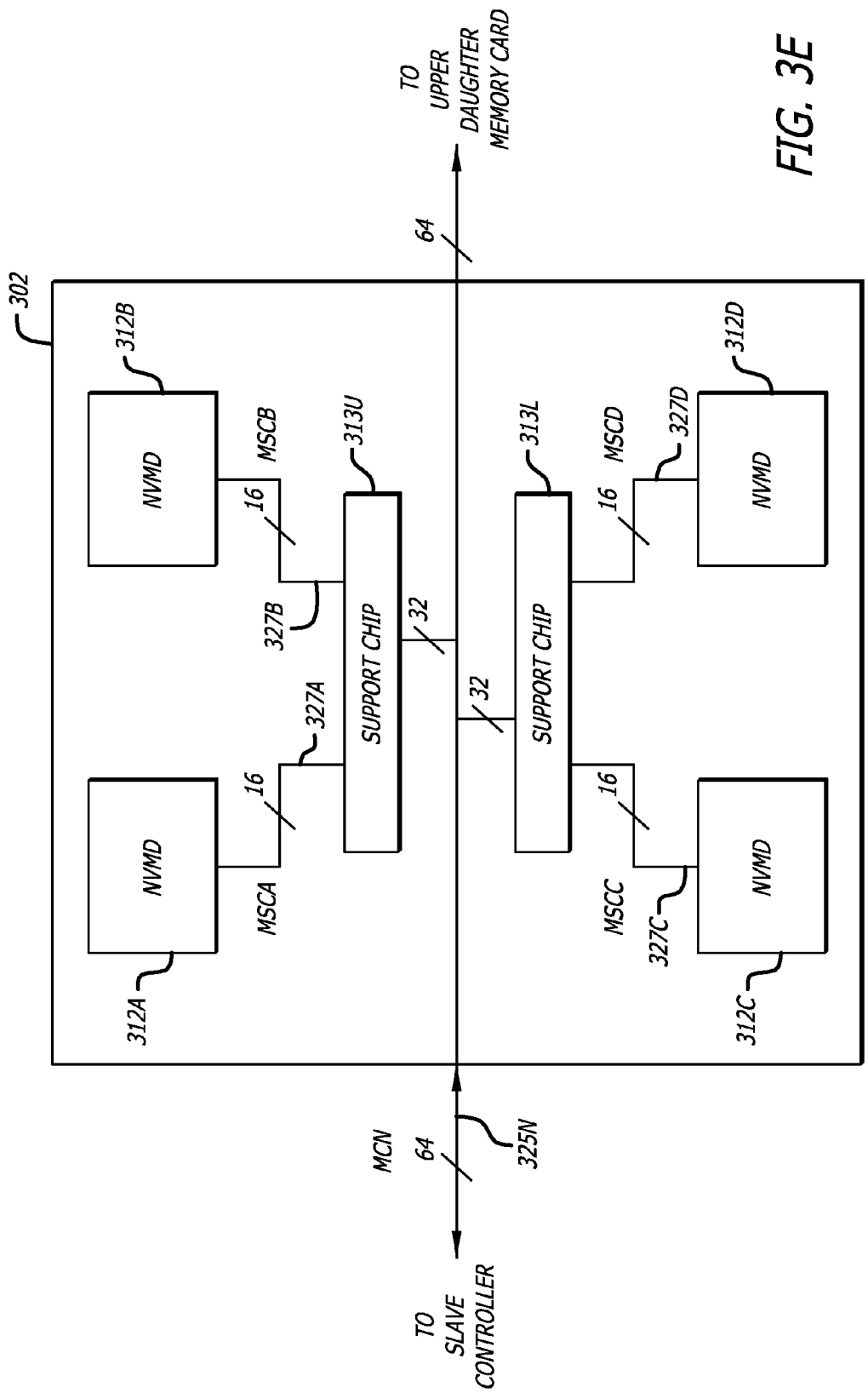
FIG. 3E is a block diagram of a pluggable daughter-memory-card that may plugged into the server memory card.

Referring now to FIG. 3E, an exemplary block diagram of a daughter memory card 302 is illustrated as an instance of the daughter memory cards 302A-302H, 302A'-302H'. The daughter memory card 302 includes non-volatile memory devices 312A-312D mounted to the board 320 and coupled to an end of printed circuit board traces that form memory subchannels.

Memory subchannels 327A-327D are formed on the daughter memory card between each NVMD and socket 323, 322 coupled to the card. For example, a memory subchannel MSCA 327A is formed between NVMD 312A and the socket. Each memory subchannel may be 16 bits wide to carry multiplexed address/data. Each memory subchannel has one or more 8 bit flash memory channels (also referred to as flash channels herein) from an NVMD. In an embodiment described herein, each memory subchannel has two 8 bit flash memory channels. In this case, each memory subchannel MSCn 327N has a 16 bit data bus with multiplexed address/data, 8 independent chip enable control bits, and additional shared control bits.

A memory channel MCn 325N of printed circuit traces on the server memory card 300 is formed between each daughter memory card 302 (pair of sockets 322-323) and the respective slave controller to which they are coupled. In an embodiment described herein, each memory channel MCn 325 has a 64 bit data bus with multiplexed address/data, 32 independent chip enable control bits, and additional shared control bits.

Each of the daughter memory cards 302A-302H, 302A'-302H' includes one or more support chips 313 mounted to the rectangular printed circuit board 320. The support chips 313 uniquely identify the daughter memory card and the non-volatile memory devices mounted thereto such as by a combination of numbers and letters similar to serial numbers. This is so the health of each non-volatile memory chip in the non-volatile memory device can be uniquely monitored for warning signs of failure mechanisms associated with non-volatile memory devices.

The support chips 313 may further multiplex signals between the non-volatile memory devices and the male and female sockets 322-323. The one or more support integrated circuits 313 may further include buffers and queue registers to transparently buffer and combine non-volatile memory access operations together to increase memory bandwidth with the non-volatile memory devices.

In the embodiment of the daughter memory card 302 illustrated in FIG. 3E, an upper support chip 313U and a lower support chip 313L are coupled to and between the memory channel 325N and the non-volatile memory devices 312A-312D. While control signals may be multiplexed by each support chip for the respective NVMDs, the 16 bit data busses of memory subchannels 327A-327D may simply pass through or around the support chips and simply be aggregated together and coupled to the data bus of the memory channel MCn 325N. Alternatively each support chip may buffer the address and data with the memory channel data/address bus.

If the daughter memory card is an intermediate card, the memory channel MCN 325n is fed through and coupled to one or more sockets so that signals may be transferred to the upper daughter memory card. In other embodiments of the invention, other methods of routing signals and making connections between the baseboard, the intermediate daughter cards, and the upper daughter cards may be used, such as a flex connector for example.

Figure 3G:
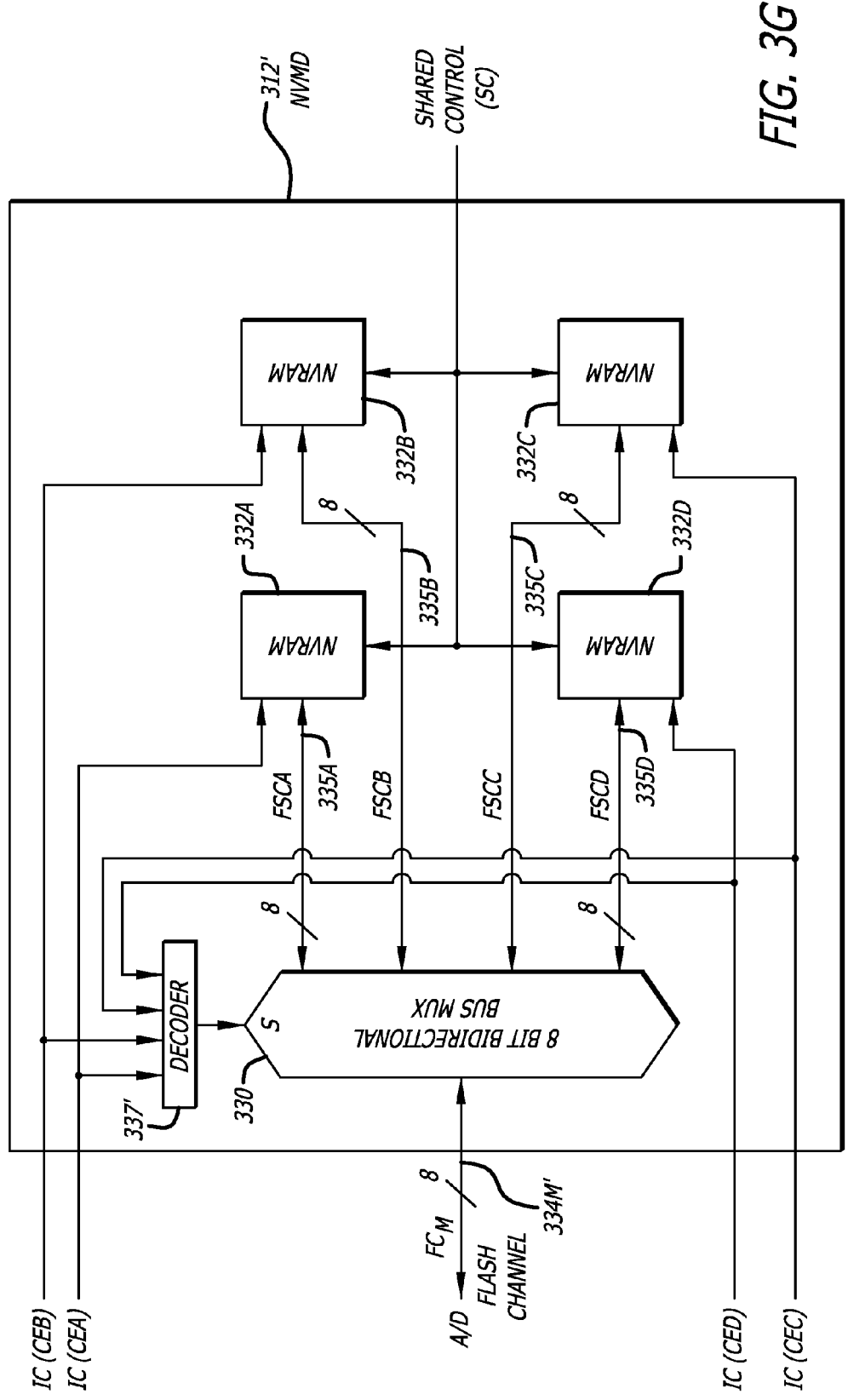
FIG. 3G is a block diagram of a alternate non-volatile memory device that may be mounted to a replaceable pluggable daughter-memory-card.

The NVMDs may be implemented differently so there are alternate embodiments. For example, FIGS. 3F and 3G illustrate different implementations.

Referring now to FIG. 3F, a block diagram of a packaged non-volatile memory device (NVMD) 312 is shown. The NVMD 312 has two flash channel interfaces FCm 334M and FCn 334N. The NVMD 312 includes a plurality of non-volatile random access memory (NVRAM) chips or integrated circuits 332A-332D and 332E-332H. The NVMD 312 further includes, a plurality of eight bit bidirectional flash subchannels (FSCA-FSCD) 335A-335D, (FSCE-FSCH) 335E-335H, bidirectional bus multiplexors 330A-330B and a decoder 337 coupled together as shown.

Each flash channel FCn 334 has an 8-bit data bus with multiplexed address/data, 4 independent chip enable control bits, and additional shared control bits. Each flash channel logically has one or more flash subchannels. A flash subchannel is the logical connection made between a daughterboard connector and a single flash NVRAM die 332 within the NVMD 312. In the embodiments shown in FIGS. 3F-3G, each flash channel is associated with four logical flash subchannels.

The NVRAM chips 332A-332H may be NAND flash memory, NOR flash memory, phase change memory, or other types of non-volatile random access memory. Each daughter-memory-card 302,302' may have different types of non-volatile random access memory that can be identified to the server memory card and the card configuration device so that read operations, write operations, and/or erase or maintenance operations can be tailored to the given type of memory. For example, flash programmable electrically erasable programmable read only memory (flash memory) has an erase operation performed on entire blocks of memory cells that is used before a write operation is performed to the block of memory cells. However, phase change memory does not need to erase blocks of memory cells before the memory cells can be written. However, other maintenance operations may be performed with phase change memory or other types of non-volatile memory. In one embodiment of the invention, the NVRAM chips are NAND flash memory die having 8 gigabits (Gb) of memory capacity per die (8 bits×1 gigabit) with a multiplex A/D data bus.

The plurality of eight bit bidirectional flash subchannels (FSCA-FSCD) 335A-335D, (FSCE-FSCH) 335E-335H are coupled between NVRAM chips 332A-332H and bidirectional bus multiplexors 330A-330B. The decoder 337, coupled to chip enable signals, can generate a select signal for the multiplexers 330A-330B to select and multiplex two of the eight flash memory subchannels onto the two flash channels FCm and FCn, respectively.

Each of the 8 bit flash subchannels and the flash channels multiplex address and data together onto the same data bus. Additionally, there are independent and shared control signal lines associated with the flash subchannels 335A-335H that couple to the NVRAM chips 332A-332H. There are eight independent chip enable control signals (CEA through CEH) one for each NVRAM chip and at least one shared control line that jointly couples to all the NVRAM chips.

Referring now to FIG. 3G, a block diagram of a packaged non-volatile memory device (NVMD) 312' is shown. The NVMD 312' has a single flash channel interface FCm 334M and includes the plurality of non-volatile random access memory (NVRAM) chips or integrated circuits 332A-332D. The NVMD 312' further includes, a plurality of eight bit bidirectional flash subchannels (FSCA-FSCD) 335A-335D, a bidirectional bus multiplexor 330 and a decoder 337' coupled together as shown.

As discussed herein, the NVRAM chips 332A-332D may be NAND flash memory, NOR flash memory, phase change memory, or other types of non-volatile random access memory. To achieve a similar capacity to the NVMD 312 on a single layer of daughter memory cards, two layers of stacked daughter memory cards may be used.

The plurality of eight bit bidirectional flash subchannels (FSCA-FSCD) 335A-335D, are coupled between NVRAM chips 332A-332D and the bidirectional bus multiplexor 330. The decoder 337', coupled to chip enable signals, can generate a select signal for the multiplexer 330 to select and multiplex one of the eight flash memory subchannels to be coupled with the one flash channel FCm.

Additionally, there are independent control signal lines (IC) and shared control signal lines (SC) associated with the flash subchannels 335A-335D that couple to the NVRAM chips 332A-332D. There are four independent chip enable control signals (CEA through CED) one for each NVRAM chip and may be one or more shared control signal lines that jointly couples to all the NVRAM chips.

Sustained Performance

In FIG. 2B, the master memory controller driver 303' stored in a storage device is in communication with each of the master memory controllers 217A'-217N' (collectively referred to as 217'). The master memory controller driver 303,303' may also be referred to as a software driver or driver software. In FIG. 4, the master memory controller driver 303,303' may be stored in the read only memory 423 or NVM 424 for example, executed by the processor 422 to initialize the memory controller 217,217'. The master memory controller driver 303 may include software instructions that when executed by the processor 422 provides support services to the server memory card (SMC) 300. The driver software may be implemented as firmware instructions executed by the embedded processor 422 of the server memory card 300 illustrated in FIG. 4.

One such support service provided is an operations scheduler to schedule read, write, and erase operations with the plurality of NVMDs 312 over the memory channel buses 334A-334N of each slave controller 402A-402B. Another support service provided is garbage collection to reclaim unused or invalid memory locations in the NVMDs 312 that are fragments of unused data or store invalid data. Garbage collection reclaims unused or invalid memory capacity in the NVMDs 312. Garbage collection is further described herein. Still another support service that may be provided is wear leveling to even out wear (write and erase operations) on the memory locations in the NVMDs.

In FIGS. 2A-2B, application software and/or operating system software may be executed by one or more of the processors 222A-222N and issue block memory access requests to the driver software 303 to read or write blocks of data with the main memory 260,260'. The driver software may aggregate a number of block memory access requests from application software and/or operating system software into sets of one or more block memory access requests against the master memory controllers 217,217A'-217N'.

Figure 5:
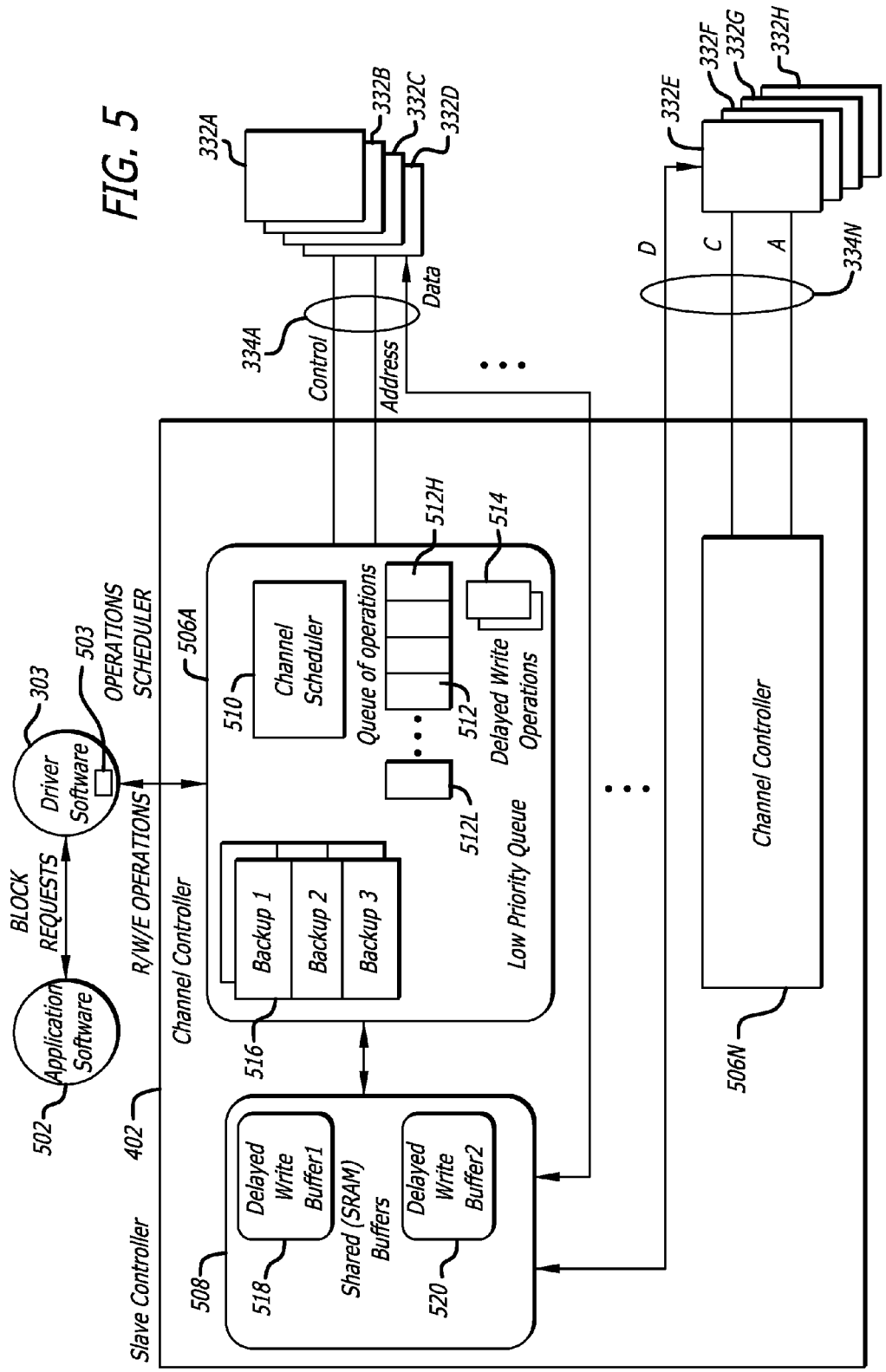
FIG. 5 is a block diagram of a slave memory controller coupled to non-volatile memory devices of a daughter-memory-card.

Referring now to FIG. 5, a slave memory controller 402 is coupled to a plurality of flash memory channels 334A-334N and their respective control (C), address (A), and data (D) busses. A plurality of NVMDs are coupled to a set of the plurality of memory channels to share buses. Application software 502 is coupled in communication with the driver software 303 to issue block memory access requests to the driver software. By way of the master memory controller, the driver software 303 is coupled in communication with the slave memory controller 402 and its one or more channel controllers 506A-506N, one for each flash channel 334A-334N. The driver software communicates read operations, write operations, and erase operations to the one or more channel controllers. The slave memory controller 402 further includes a shared data buffer 508. The one or more channel controllers 506A-506N are coupled in communication with the shared data buffer 508. The shared data buffer 508 is coupled to the data busses of the plurality of memory channels 334A-334N to read and write data with the NVMDs. The one or more channel controllers 506A-506N are coupled to the control and address busses of the plurality of memory channels 334A-334N to send address and control signals to the NVMDs.

Each NVMD can independently execute one read, write, or erase operation at a time. A memory channel can communicate one read, write, or erase operation at a time to an NVMD. For example, while four operations are coincidentally executed by four NVMDs, one operation is being communicated over the memory channel at a time to an NVMD of a plurality of NVMDs coupled thereto. Regardless the slave memory controller is coupled to the plurality of memory channels in communication between the plurality of NVMDs 312A-312D (collectively referred to as 312).

Each of the one or more channel controllers 506A-506N includes a channel scheduler 510, an operations queue 512, a delayed write operations storage 514, and a backup storage 516 coupled in communication together. The channel scheduler 510 schedules control and data transfers associated with the read, write, and erase operations on a memory channel. The operations queue may be formed of a high and low priority queue coupled in communication with the channel scheduler 510. The read, write and erase operations from the driver software are stored in the low priority queue and the high priority queue of the operations queue 512. The channel scheduler prioritizes the operations waiting in the high priority queue over the operations waiting in the low priority queue. The channel scheduler further prioritizes read operations waiting in either the high priority queue or the low priority queue over write and erase operations waiting in each respective queue.

The application or operating system software 502 includes instructions that when executed by a processor issues block memory access requests. The driver software 303 includes instructions that when executed by a processor provide an operations scheduler 503 to receive the block memory access requests.

The driver software 303 issues read, write, and erase operations to the plurality of NVMDs coupled to each of the plurality of memory channels in response to the block memory access requests. The high priority read, write and erase operations are stored in the high priority queue of the operations queue 512 by the driver software 303. The low priority read, write and erase operations are stored in the low priority queue of the operations queue 512 by the driver software 303. The operation of the driver software to schedule read and write operations is in part responsive to the application software or operating system making block memory access requests. The operation of the driver software to schedule read, write and erase operations is further responsive to garbage collection activity with the plurality of NVMDs.

The read, write erase operations correspond to application data requests, metadata requests, and garbage collection requests. Application data requests are block memory access requests made by the application software 502. Metadata requests are requests to store translations between a logical block number in a block device view and a physical block address identifying a unique memory block in an NVMD. Garbage collection requests correspond to operations issued by the driver software 303 to reclaim unused or invalid memory capacity in the NVMDs. Application data requests and metadata requests are stored in the high priority queue of the operations queue. Garbage collection requests are stored in the low priority queue of the operations queue. The driver software may provide fairness in execution of high and lower priority operations. The driver software monitors the number of outstanding high and lower priority operations in the high and low priority queues. In response to the number of outstanding low priority operations reaching a predetermined threshold, the driver software may throttle down the execution of the high priority operations in the high priority queue so that outstanding low priority operations are executed.

Each server memory card has a two-level scheduling hierarchy including an operation scheduler 503 at the driver level for each server memory card, and a channel scheduler 510 at the slave controller level for each channel controller 506A-506N as shown in FIG. 5.

The operation scheduler 503 takes into consideration the mix of operations issued against a logical view of the NVMDs. The operation scheduler 503 thinks of the collection of NVMDs at the level of flash channels 334A-334N and not at the level of the individual NVRAM dice 332A-332H.

The channel scheduler 510 is responsible for dealing with the specifics of the NVRAM dice 332A-332H behind the flash channels 334A-334N. The channel scheduler 510 orchestrates use of the shared address/data busses in each flash subchannel 335A-335H by the NVRAM dice 332A-332H to maximize performance of the server memory card.

At its level, the operation scheduler is responsible for making progress on all three types of operations (read, write, erase), in a fashion that allows overall progress on the workload of interest; making sure that low-latency operations such as reads don't end up getting queued behind longer-latency operations such as erases; making sure that the mixing of requests from application block requests, meta-data requests, and garbage collection requests are handled appropriately; and managing power consumption of the card (reads, writes, and erases consume different power, so the operation scheduler can control overall card power consumption by controlling how many of these are active at a time).

At its level, the channel scheduler is responsible for managing bus utilization for multi-phase operations with different latency—predictable latency such as reads, as well as varying latency such as writes and erases; prioritizing channel allocation for high-priority vs. low-priority operations; and within the high-priority operations, prioritizing low-latency operations to reduce blocking times at the application level. In response to the scheduled read, write, and erase operations with the plurality of NVMDs scheduled by the operations scheduler 503, a channel scheduler associated with a memory channel may schedule read operations, write operations, and erase operations to maximize channel utilization.

For example, in response to a set of one or more block memory access requests, the driver software schedules X NVMDs to perform read operations, Y NVMDs to perform write operations, and Z NVMDs to perform erase operations. The variables X, Y, and Z are responsive to the work load required by the application or operating system software and their sum (X+Y+Z) corresponds to the total number of NVMDs in the system (or alternatively the number of concurrently activatable NVMDs given a power budget). The selection of values for X, Y, and Z may be a function of the read to write ratio of the application workload requests and whether or not garbage collection is active with the plurality of NVMDs.

Garbage collection is a method of recovering memory space in each NVMD and may be activated for a number of reasons. Garbage collection may be activated when a ratio of currently used capacity to available capacity exceeds a first threshold and deactivated when the ratio falls below a second threshold different from the first. Alternatively or conjunctively, garbage collection may be activated for regions of memory locations in an NVMD that exceed a predetermined time limit of last access.

If garbage collection is inactive, values for X, Y, and Z may be selected to limit the impact of NVMD write and erase operations on NVMD read operations. Alternatively if garbage collection is inactive, values for X, Y, and Z may be selected to limit the impact on NVMD read latencies for NVMD read operations and to limit the impact on NVMD write latencies for NVMD write operations. If garbage collection is active, values for X, Y, and Z may be selected to match a rate of freeing capacity by the garbage collection activity to a rate of consumption of capacity by the application workload.

Card Configuration and Health Maintenance Indicators

Referring now to FIG. 4, the server memory card 300 may be upgraded by adding additional NVRAM daughter-memory-cards 302 to increase its memory capacity. Alternatively, the server memory card 300 may have maintenance performed to maintain the reliability of a server system by periodically replacing NVRAM daughter-memory-cards 302. The server memory card 300 may include a non-volatile card configuration device (CCD) 420 to identify each daughter-memory-card 302 and the NVMDs 312 mounted thereto. The non-volatile card configuration device 420 may further track bad block information and/or other health indicators associated with each NVMD. The non-volatile card configuration device 420 may store a table 601 of bad block information and other health indicators associated with each NVMD. The non-volatile card configuration device 420 may further store a table 602 of threshold values against which the tabulated bad block information and health indicators may be compared to determine if an NVMD within a daughter-memory-card is failing.

FIG. 6A illustrates an exemplary table 601 of tabulated bad block information and health indicators associated with each NVMD and daughter-memory-card. For each row, the table includes a column of data providing a unique identification of the daughter-memory-card (DCID) that is plugged into the server memory card 300A. For each row, the table further includes a column of data providing an identification (NVMDID) of each of the non-volatile memory devices (NVMD) mounted to the identified daughter-memory-card. For each row, the table further includes a column of data providing bad block (BB) information associated with the identified NVMD. For each row, the table further includes columns of data providing health indicators associated with the identified NVMD. The health indicators may include the number of correctable errors CEN, the write operation latency WOL, the erase operation latency EOL, the program error count PWC, the erase error count EWC, and the program erase count PEC for each identified NVMD.

For example, the table 601 in FIG. 6A includes four rows with a daughter-memory-card identification (DCID) of DC0, one for each of four non-volatile memory devices NVMD0-NVMD3. The non-volatile memory device NVMD2 of the daughter-memory-card DC0 has a bad block count of 12, correctable error number of 126, a write operational latency of 334, an erase operation latency of 997, a program write error count of 5, an erase error count of 7, and a program erase count of 1529.

FIG. 6B illustrates an exemplary table 602 of threshold levels that are stored in the card configuration device 420. The threshold levels stored in the table may include a bad block threshold, a program erase count threshold, a correctable error number threshold, a write operational threshold, an erase operation latency threshold, a program write error count threshold, and an erase error count threshold. For example, the threshold levels stored in the table 602 may include a bad block threshold of 400, a program erase count threshold of 100000, a correctable error number threshold of 10000, a write operation latency threshold of 500, an erase operation latency threshold of 1500, a program write error count threshold of 200, and an erase error count threshold of 200 as shown in FIG. 6B.

The table 602 of threshold values may be used to compare against the tabulated bad block information and health indicators of table 601 to determine if an NVMD within a daughter-memory-card may be worn out and should be replaced or is failing and in need of replacement. The table 601 is updated when different or additional daughter-memory-cards are plugged into the server memory card 300A.

Figure 12A:
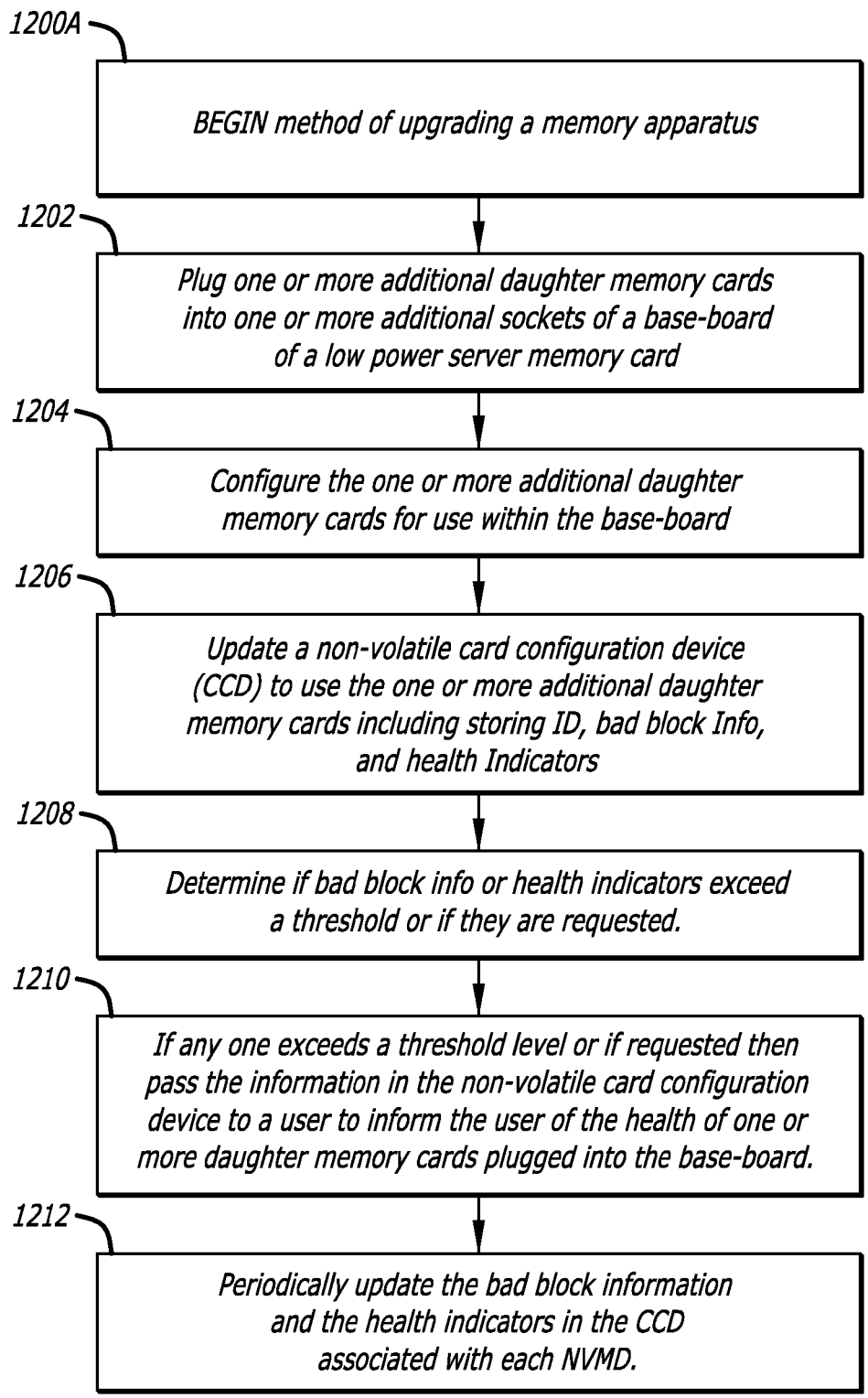
FIG. 12A illustrates a flow chart of a method of upgrading a server memory card by adding one or more new daughter-memory-cards to a server memory card.

Referring now to FIG. 12A, a method of upgrading a memory apparatus is now described with the process beginning with process 1200A and then going to process block 1202.

At process block 1202, one or more additional daughter-memory-cards are plugged into one or more additional sockets. The process then goes to process block 1204.

At process block 1204, the one or more additional daughter-memory-cards are configured for use within the base-board. The process then goes to process block 1206.

At process block 1206, the non-volatile card configuration device (CCD) 420 is updated so that the use the one or more additional daughter-memory-cards plugged into the server memory card 300A may be used as part of the main memory 260 of the compute server. The non-volatile card configuration device is updated by storing the unique identification of the one or more additional daughter-memory-cards and each of non-volatile memory devices (NVMD) mounted to the daughter-memory-cards; bad block information associated with each NVMD; and the health indicators associated with each NVMD. The process then goes to process block 1208.

At process block 1208, a determination is made if the bad block information (number) or one of the health indication numbers exceeds a threshold level or if the bad block information (number) or one of the health indication numbers was requested to be read out.

At process block 1210, if any one of the bad block or health indictors exceed a threshold level or if requested, then the information in the non-volatile card configuration device that exceeds the threshold or is requested is passed to a user to inform the user of the health of one or more daughter-memory-cards plugged into a base-board of the server memory card. The process then goes to process block 1212.

At process block 1212, the bad block information and the health indicators associated with each NVMD in the card configuration device is periodically updated. The bad block information may be updated in response to a determination that a block of data capacity in an NVMD is a bad data block. The health indicators may be updated if there is an increase over that stored in the card configuration device (CCD). The health indicators may be updated if a correctable error occurs to increase the number of correctable errors indicator for an NVMD stored in the card configuration device, a write operation occurs with a write operation latency to increase the write operation latency indicator for an NVMD stored in the CCD, an erase operation occurs with an erase operation latency to increase the erase operation latency indicator for an NVMD stored in the CCD, a program write error occurs to increase the program error count indicator for an NVMD stored in the CCD, or an erase error occurs to increase the erase error count indicator for an NVMD stored in the CCD.

Figure 12B:
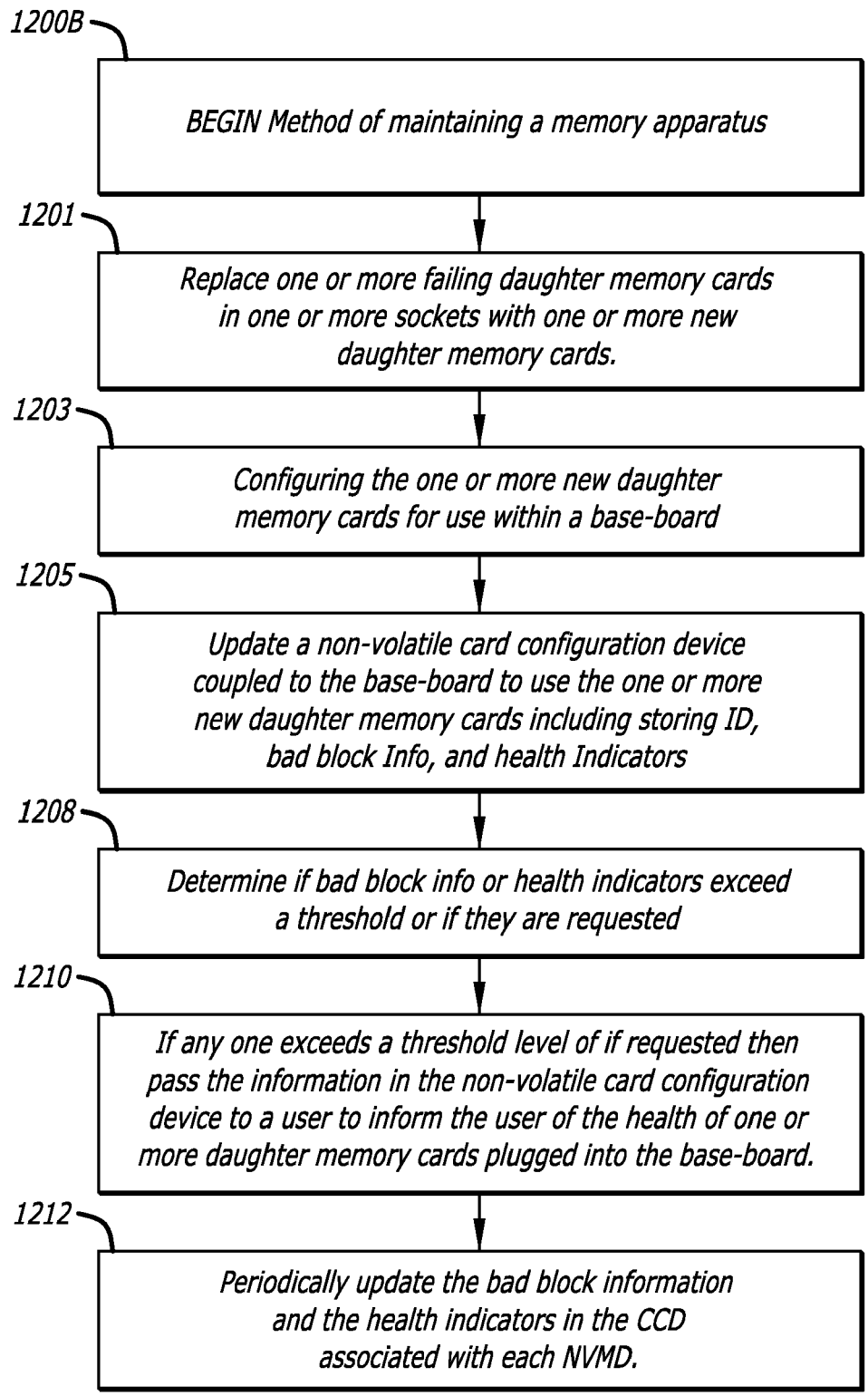
FIG. 12B illustrates a flow chart of a method of maintaining a server memory card by replacing failing daughter-memory-cards in a server memory card.

Referring now to FIG. 12B, a method of maintaining a memory apparatus is now described with the process beginning with process block 1200B and then going to process block 1201.

At process block 1201, one or more failing daughter-memory-cards in one or more sockets is replaced with one or more new daughter-memory-cards. The process then goes to process block 1203.

At process block 1203, the one or more new daughter-memory-cards are configured for use within the base-board of the server memory card. The process then goes to process block 1205.

At process block 1205, the non-volatile card configuration device coupled to the base-board is updated to use the one or more new daughter-memory-cards. The non-volatile card configuration device is updated to include an unique identification of the daughter-memory-card and each of non-volatile memory devices (NVMD) mounted to the daughter-memory-card; bad block information associated with each NVMD; and health indicators (number of correctable errors, write/erase operation latencies, program error count; program erase counts, etc.) associated with each NVMD. The process then goes to process block 1208.

At process block 1208, a determination is made if the bad block information (number) or one of the health indication numbers exceeds a threshold level or if the bad block information or health indication number has been requested to be read out. The process then goes to process block 1208.

At process block 1210, if any one of the bad block or health indictors exceed a threshold level or if requested, then the information in the non-volatile card configuration device is passed to a user to inform the user of the health of one or more daughter-memory-cards plugged into a base-board of the server memory card. The information in the non-volatile card configuration device may be passed to the host server system, the compute server, to inform the user of the health of one or more daughter-memory-cards plugged into the base-board. Alternatively, the information in the non-volatile card configuration device may be read out through its input/output interface 603 and communication port to inform the user of the health of one or more daughter-memory-cards plugged into the base-board. The process then goes to process block 1212.

At process block 1212, the bad block information and the health indicators associated with each NVMD in the card configuration device is periodically updated.

Figure 13:
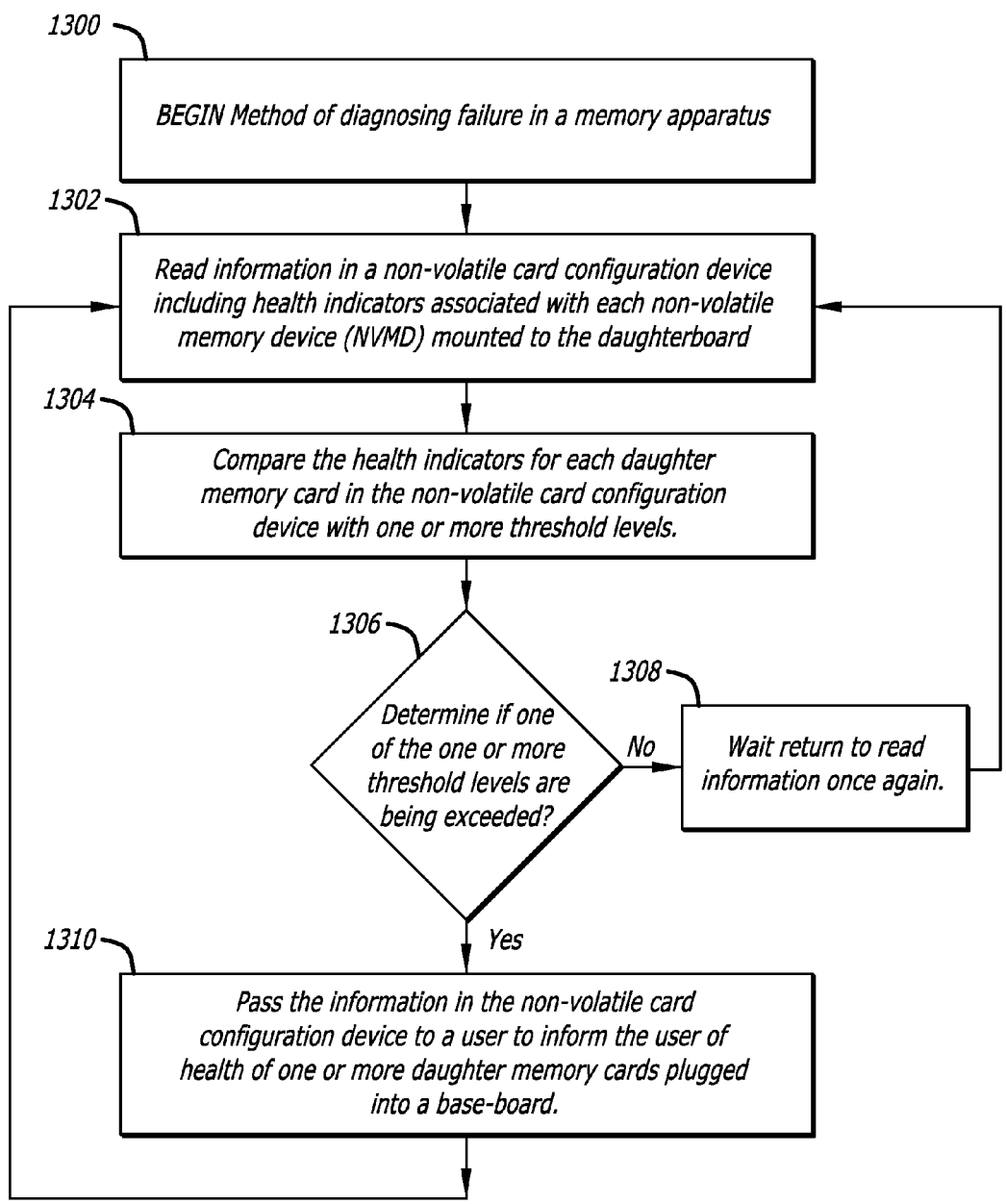
FIG. 13 illustrates a flow chart of a method of diagnosing failure in a server memory card.

Referring now to FIG. 13, a method of diagnosing failure in a server memory card is now described with the process beginning with process block 1300 and then going to process block 1302.

At process block 1302, information in the non-volatile card configuration device is read including the unique identification of the daughter-memory-cards and each non-volatile memory device (NVMD) mounted to the daughter-memory-cards. For each NVMD and row in a table stored in the card configuration device bad block information associated with each NVMD, and health indicators associated with each NVMD are also read. The health indicators for each non-volatile memory device may include one or more of a number of correctable errors, a write operation latency, an erase operation latency, a program error count, an erase error count, and a program erase count. The process then goes to process block 1304.

At process block 1304, the health indicators for each daughter-memory-card in the non-volatile card configuration device are compared with one or more threshold levels associated with each health indicator. The process then goes to process block 1306.

At process block 1306, a determination is made if one or more threshold levels are being exceeded. If no threshold level is exceeded, the process goes to process block 1308. If a threshold is exceeded, the process goes to process block 1310.

At process block 1308, with no threshold exceeded, the process waits for a predetermined period of time and returns to process block 1302 to cycle through again to diagnose a failure.

At process block 1310, in response to at least one of the one or more threshold levels being exceeded, the information in the non-volatile card configuration device is passed to a user to inform the user of health of one or more daughter-memory-cards plugged into the baseboard of the server memory card.

Redundant Data Storage

As a compute server requires data storage to be reliable, it is desirable to make the NVRAM on the daughter-memory-cards reliable. A daughter-memory-card may begin to fail, requiring removal and replacement with a new daughter-memory-card with new NVRAM. It is desirable to be able to recover the data that was previously stored on a failed daughter-memory-card with failed NVRAM. To provide reliable data storage, the NVRAM of the daughter-memory-cards may be treated like a redundant array of independent disks (RAID). Generally, data is stored as a collection of data chunks in data stripes across the NVRAM of the daughter-memory-cards for each respective page of data. To provide reliability, a parity stripe is also stored across the NVRAM of the daughter-memory-cards for each respective page of data.

Figure 7:
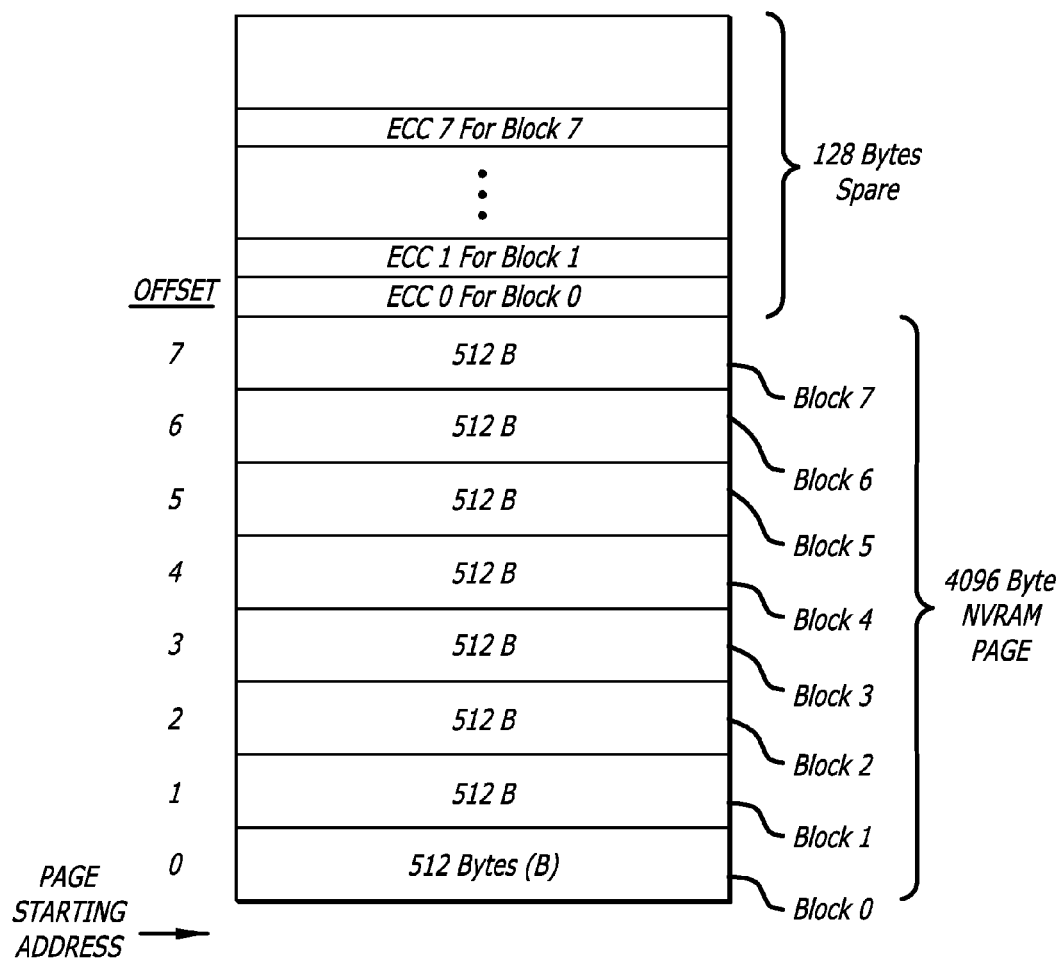
FIG. 7 illustrates a diagram as to how 4-kilobyte page is stored in a non-volatile random access memory (NVRAM) chip.

FIG. 7 illustrates how a 4 kilo-byte page is stored in a non-volatile random access memory (NVRAM) chip, at least one of which is packaged within each nonvolatile memory device (NVMD) mounted to the daughter-memory-card. An offset address zero through seven from the page address allows the data to be stored in 512 byte portions. For each 4 k byte page, there are 128 bytes of spare NVRAM to store error correction coded (ECC) data that is used for error correction of data that is stored within the page. An error correction code may be generated for each 512 byte portion of each 4 k byte page in the spare memory error. Program write errors or flash read errors may be detected using the error correction code. While ECC is useful to correct an a priori anticipated threshold of bit errors, redundant data storage may be used to recover data when the number of bit errors exceeds the a priori threshold or due to a complete failure of a storage device, such as a daughter-memory-card 302,302'.

Figure 8A:
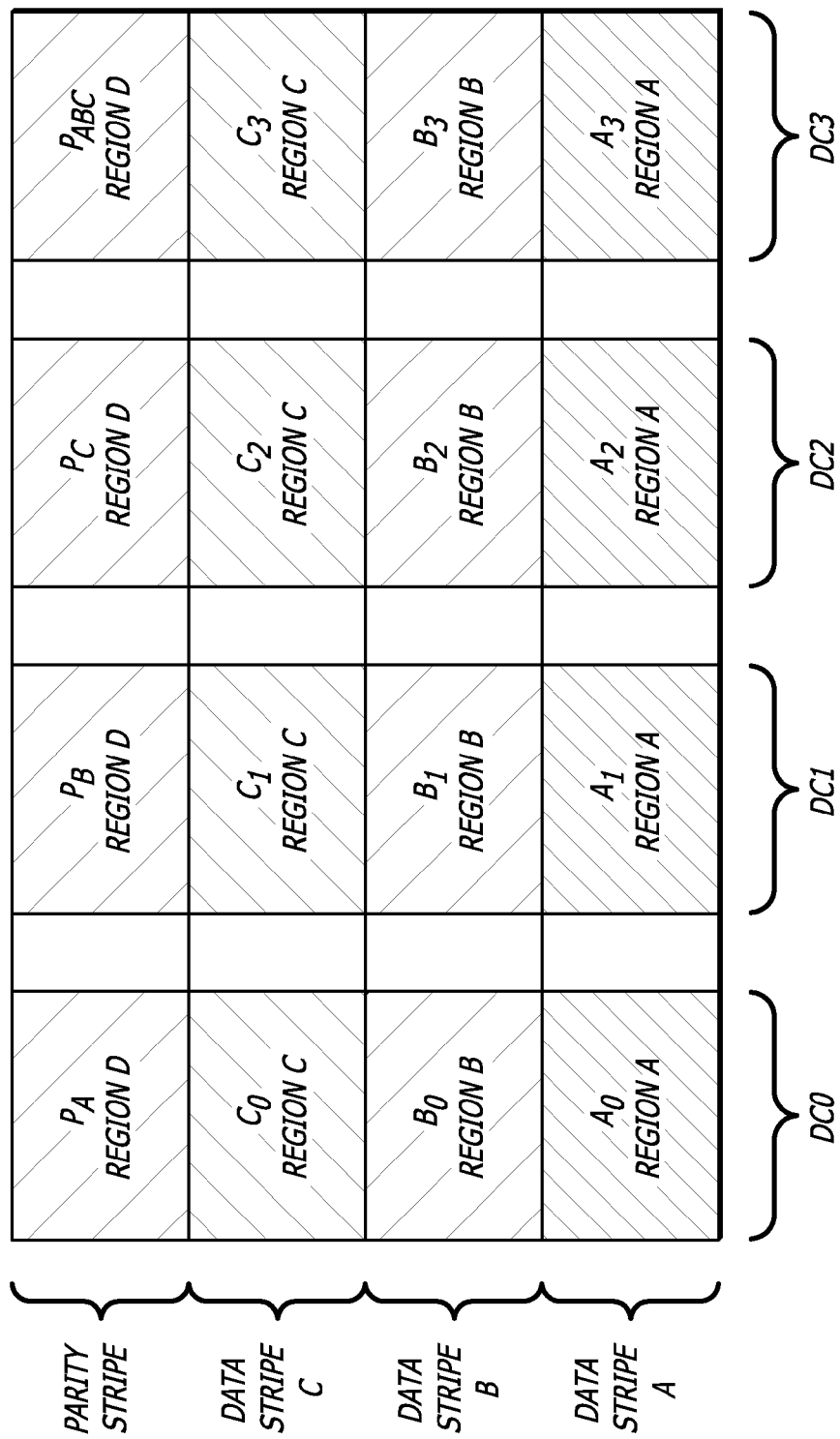
FIG. 8A illustrates a diagram of how four daughter-memory-cards are used to provide redundant data storage in a server memory card.

Data may be stored in one or more 512 byte regions across a page (referred to as a chunk) with one or more consecutive offset addresses respectively. For example in one embodiment, employing a single offset address allows a 512 byte chunk of data to be stored across a region of the page of an NVRAM. A RAID array in this case may be consistently written with regions of 512 byte chunks of data. This may be the case with seven data stripes and one parity stripe spread across eight daughter memory cards for example. Each daughter memory card sees a 512 byte region for each stripe within the same write page. As another example for an alternate embodiment, a pair of offset addresses (e.g., offset address 6 and 7) may be used to allow 1 kilo-byte (Kbyte) chunks of data to be stored in regions of the page of the NVRAM. A RAID array in this case may be consistently written with regions of 1 Kbyte chunks of data. This may be the case with three data stripes and one parity stripe spread across four daughter memory cards, such as shown in FIG. 8A for example. Each daughter memory card sees a 1 Kbyte region for each stripe within the same write page.

Reference is now made to FIGS. 8A-8B, which show data being redundantly stored as a collection of data chunks in data stripes across the NVRAM of the daughter-memory-cards for each respective page of data, together with a parity stripe also stored across the NVRAM of the daughter-memory-cards for each respective page of data. The parity stripe is formed of parity chunks and a single meta-data parity chunk. The parity chunks are generated by computing parity of the chunks of data stored in the data stripes of each page on each daughter-memory-card. The meta-data parity chunk is parity computed from the plurality of parity chunks previously generated.

The parity chunks and the meta-data parity chunk in the parity stripe are selectively stored on differing daughter-memory-cards so that data can be recovered in response to a failure, removal, and replacement of a daughter-memory-card. Each chunk of data in a stripe is also stored in a different daughter-memory-card so that data can be recovered in response to a failure, removal, and replacement of a daughter-memory-card.

In FIG. 8A for example, the A0 chunk of data in the data stripe A is stored in the daughter-memory-card DC0, the A1 chunk of data in the data stripe A is stored in the daughter-memory-card DC1, the A2 chunk of data in the data stripe A is stored in the daughter-memory-card DC2, and the A3 chunk of data in the data stripe A is stored in the daughter-memory-card DC3.

The parity chunks and the meta-parity chunk can be stored arbitrarily across the daughter memory cards provided their locations are known. Consider the parity chunks $P_A$, $P_B$, and $P_C$ and the meta-parity chunk $P_{ABC}$ in the example illustrated in FIG. 8A. For example, the $P_A$ chunk in the parity stripe is stored in the daughter-memory-card DC0, the $P_B$ chunk in the parity stripe is stored in the daughter-memory-card DC1, the $P_C$ chunk in the parity stripe is stored in the daughter-memory-card DC2, and the meta-parity chunk $P_{ABC}$ of the parity stripe is stored in the daughter-memory-card DC3 as shown in FIG. 8A. Alternatively, the meta-parity chunk $P_{ABC}$ in the parity stripe may be stored in the daughter-memory-card DC0, the $P_A$ chunk in the parity stripe may be stored in the daughter-memory-card DC1, the $P_B$ chunk in the parity stripe may be stored in the daughter-memory-card DC2, and the $P_C$ chunk of the parity stripe may be stored in the daughter-memory-card DC3.

Furthermore, in a given daughter card, chunks of data from each data stripe and a parity chunk are stored in different 512 byte or 1 k-byte regions of the same flash write page of the same flash memory integrated circuit. In FIG. 8A for example, the A0 chunk of data in the data stripe A, the B0 chunk of data in the data stripe B, the C0 chunk of data in the data stripe C, the PA chunk of parity data in the parity stripe are respectively stored in Region A, Region B, Region C, and Region D of the same flash memory page in the same flash memory integrated circuit in the same daughter-memory-card DC0. The data stripes and the parity stripe are stored at different offsets in the flash write page. Each flash write page for the flash memory chips in the RAID of daughter memory cards is logically written in a similar format.

To provide RAID-like reliability, three or more daughter-memory-cards are utilized. Typically four, eight, or sixteen daughter-memory-cards may be used. A software driver or embedded firmware operating on the host system may accumulate data, calculate parity, and store the data and parity information as stripes across the daughter-memory-cards. In this case, the parity calculations are performed by the host CPU, as part of the instructions of the host software driver or embedded firmware.

In an alternate embodiment of the invention, the software driver operating on the server memory card (SMC) 300 may accumulate the data and initiate a command to the master controller. The master controller can then be responsible for computing the parity information and storing the data and parity stripes across the daughter-memory-cards.

FIG. 8A illustrates the use of four daughter-memory-cards (DC0, DC1, DC2, DC3), for example, to provide redundant data storage. Three data stripes, data stripe A (DSA), data stripe B (DSB), and data stripe C (DSC), are written across the four daughter-memory-cards DC0-DC3. The parity chunk $P_A$ is the parity of the data strip A. The parity chunk $P_A$ is the parity of the data strip A. The parity chunk $P_C$ is the parity of the data strip C. The meta parity chunk $P_{ABC}$ is the parity of the set of parity data chunks $P_A$, $P_B$, and $P_C$ ($P_{ABC}=P_A \oplus P_B \oplus P_C$). In alternate embodiments of the invention, the parity chunks $P_A$, $P_B$, $P_C$, and the meta parity chunk $P_{ABC}$ making up the parity stripe may be laid out across the four daughter-memory-cards in a fashion different from that shown in the figures, with the restriction that each daughter-memory-card gets only one respective chunk of the parity stripe for each page. While FIG. 8A illustrates four daughter-memory-cards, the algorithm can be readily expanded to N daughter-memory-cards or daughter memory cards as shown in FIG. 8B, where N is three or more. Typically N is four, eight or sixteen, for example.

The algorithm employs N daughter-memory-cards DC0 through DCN over which (N-1) or M data stripes, and one parity stripe are written across for each flash write page as shown in FIG. 8B. The algorithm stripes data and parity across multiple write pages in the different daughter memory cards without having to map the stripes to different chips in the same daughter memory card. The data stripes and parity stripes are written to different offsets within one or a couple of Flash write pages for each constituent daughter memory card. The parity data chunk PA is a result of determining the parity of the data stripe A. The parity data chunk PB is a result of determining the parity of the data stripe B. The parity data chunk PC is a result of determining the parity of the data stripe C. PN represents the parity meta data chunk stored in an NVMD on the daughter-memory-card DCN with its value being the parity of the parity data chunks PA through PM.

The redundant data storage may provide on the fly, hot pluggable replacement of a daughter-memory-card 302,302'. If any one or more of the chips storing data fails, the entire daughter-memory-card can be unplugged from the server memory card, a new or different daughter-memory-card plugged into the vacant sockets, and all data recovered and written into the new daughter-memory-card using a recovery algorithm and data stored in the other daughter-memory-cards.

Methods for redundant data storage across multiple non-volatile storage devices on N daughter-memory-cards are now described with reference to FIGS. 9A-11B.

Figure 9A:
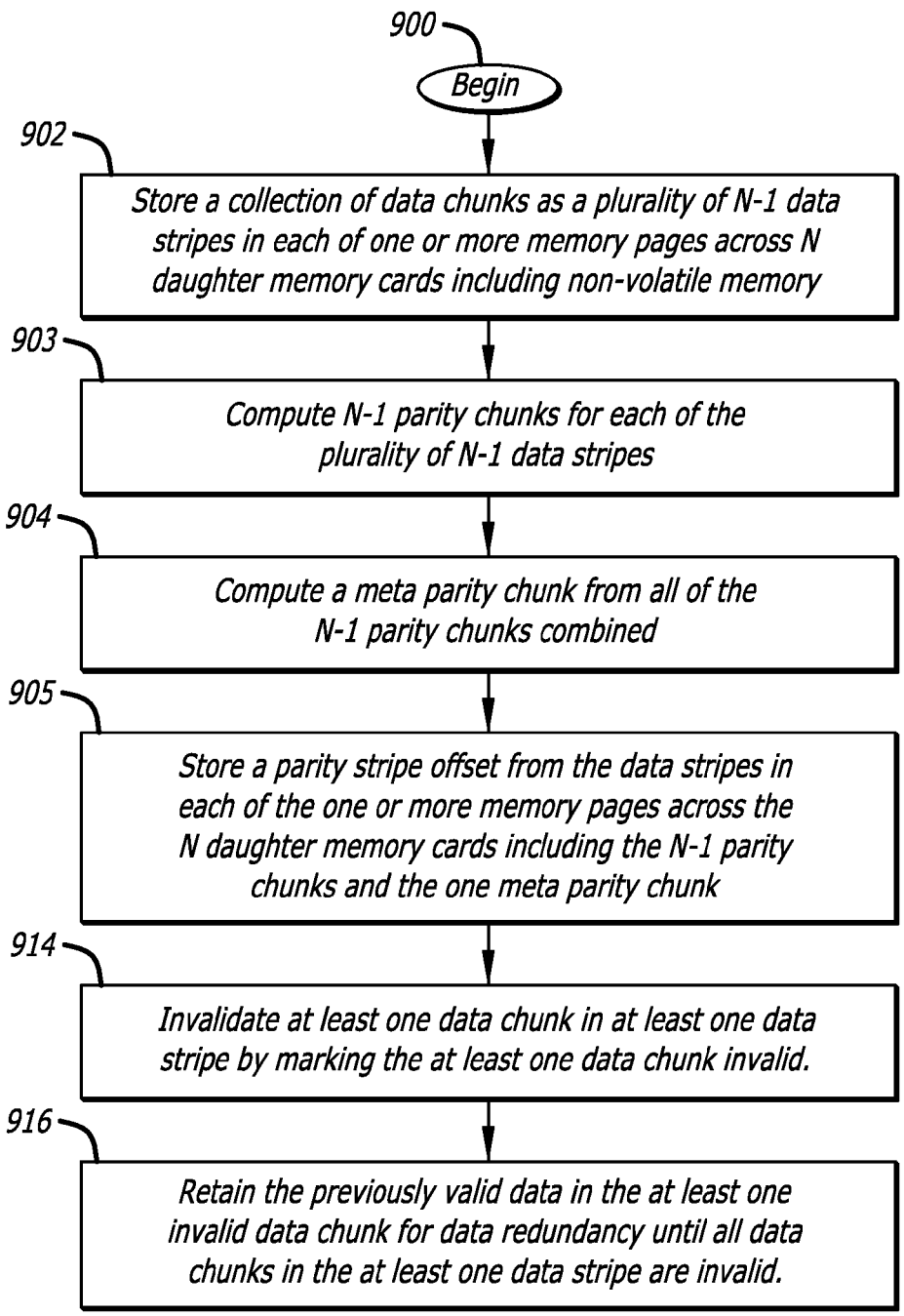
FIG. 9A illustrates a flow chart of a method for storing data in a redundant data storage format across multiple daughter-memory-cards.

In FIG. 9A, a method for writing redundant data storage across multiple storage devices begins with process block 900 and goes to process block 902.

At process block 902, a collection of data chunks is stored as a plurality of N-1 data stripes across N daughter-memory-cards including non-volatile memory. Each data chunk of up to N data chunks that form a data stripe is stored in a different daughter-memory-card. Moreover, data chunks are stored at different offsets within a flash memory page of each daughter memory card to stripe data and form the plurality of data stripes over the N daughter-memory-cards.

At process block 903, N-1 parity chunks are computed for each of the plurality of N-1 data stripes. For example, a first parity chunk is computed from all of the data chunks stored in the first data stripe. The N-1 parity chunks may be stored across the daughter-memory cards to begin forming the parity stripe. Otherwise, a meta parity chunk can be computed to complete the chunks for the parity stripe so that they can be stored together. The process goes to process block 904.

At process block 904, a meta parity chunk is computed from all of the N-1 parity chunks that were previously computed. The meta parity chunk can be stored together with the N-1 parity chunks across the daughter-memory cards to complete the parity stripe. The process goes to process block 905.

At process block 905, a parity stripe is stored across the N daughter-memory-cards including N-1 parity chunks and one meta parity chunk. The parity chunks and meta parity chunk within the daughter-memory-cards are stored offset from the data chunks within each flash memory page to stripe the parity data. Each $K^{th}$ daughter-memory-card of N-1 daughter-memory-cards stores a Kth data parity chunk of the N-1 parity chunks computed as parity of up to N data chunks forming the Kth data stripe. The $N^{th}$ daughter-memory-card of the N daughter-memory-cards stores the meta parity chunk computed as parity of the N-1 data parity chunks stored in the respective N-1 daughter-memory-cards. In alternate embodiments of the invention, the parity chunks and the meta parity chunk making up the parity stripe may be laid out across the N daughter-memory-cards in a different fashion, with the restriction that each daughter-memory-card gets only one respective chunk of the parity stripe. The N-1 data chunks and the one data parity chunk or meta parity chunk in a daughter-memory-card collectively may have a size of one or a couple of write pages into non-volatile memory. In one embodiment of the invention, the write page size into the non-volatile memory is four kilobytes.

At process block 914, during the course of operation of application software or operating system software, a data chunk in a data stripe may be invalidated. At least one data chunk in at least one data stripe is invalidated and it is marked invalid therein. The process then goes to process block 916.

At process block 916, instead of erasing the data chunk that is now invalid, the process retains the previously valid data chunk. The previous valid data chunk is retained for data redundancy until all data chunks in the data stripe are invalidated and marked invalid. Thereafter, the data stripe with invalid data chunks can be erased and reclaimed by garbage collection, for example, and then written with new valid data.

Figure 9B:
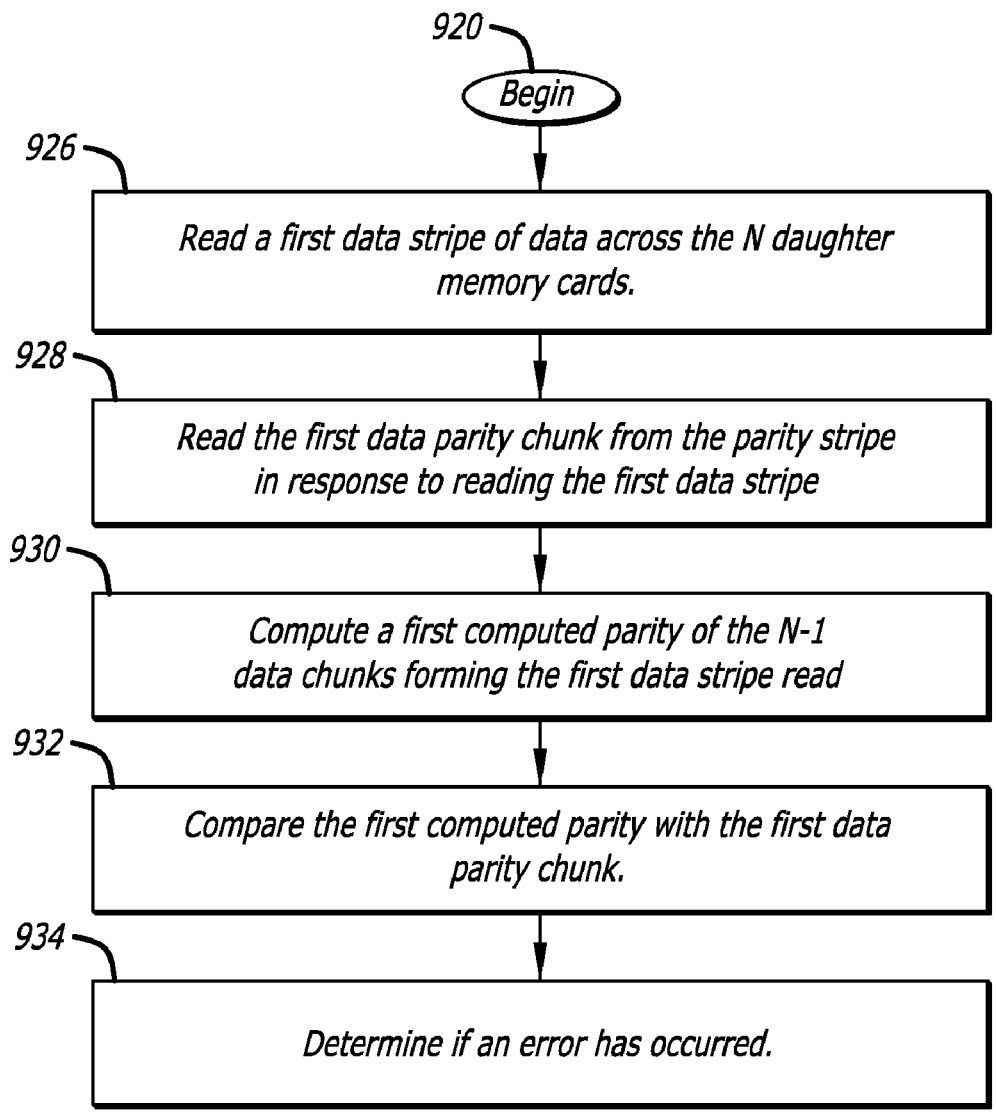
FIG. 9B illustrates a flow chart of a method for reading data from redundant data storage across multiple daughter-memory-cards.

In FIG. 9B, a method for reading redundant data storage across multiple storage devices begins with process block 920 and goes to process block 926.

At process block 926, a first data stripe of data across N daughter-memory-cards may be read.

At process block 928, a first parity chunk is read from a parity stripe in response to reading the first data stripe.

At process block 930, a first computed parity of the N-1 data chunks forming the first data stripe is read.

If ECC bits are also stored as normal in the flash memory pages, an ECC check may be performed for each chunk of data or parity that is read out from the data stripe and the parity stripe.

Optionally at process block 932, the first computed parity may be compared with the first data parity chunk to determine if a parity error has occurred.

At process block 934, a determination is made if there is a read error. If an ECC error or parity error has occurred, valid data may still be recovered from the data redundancy that is provided.

Figure 10:
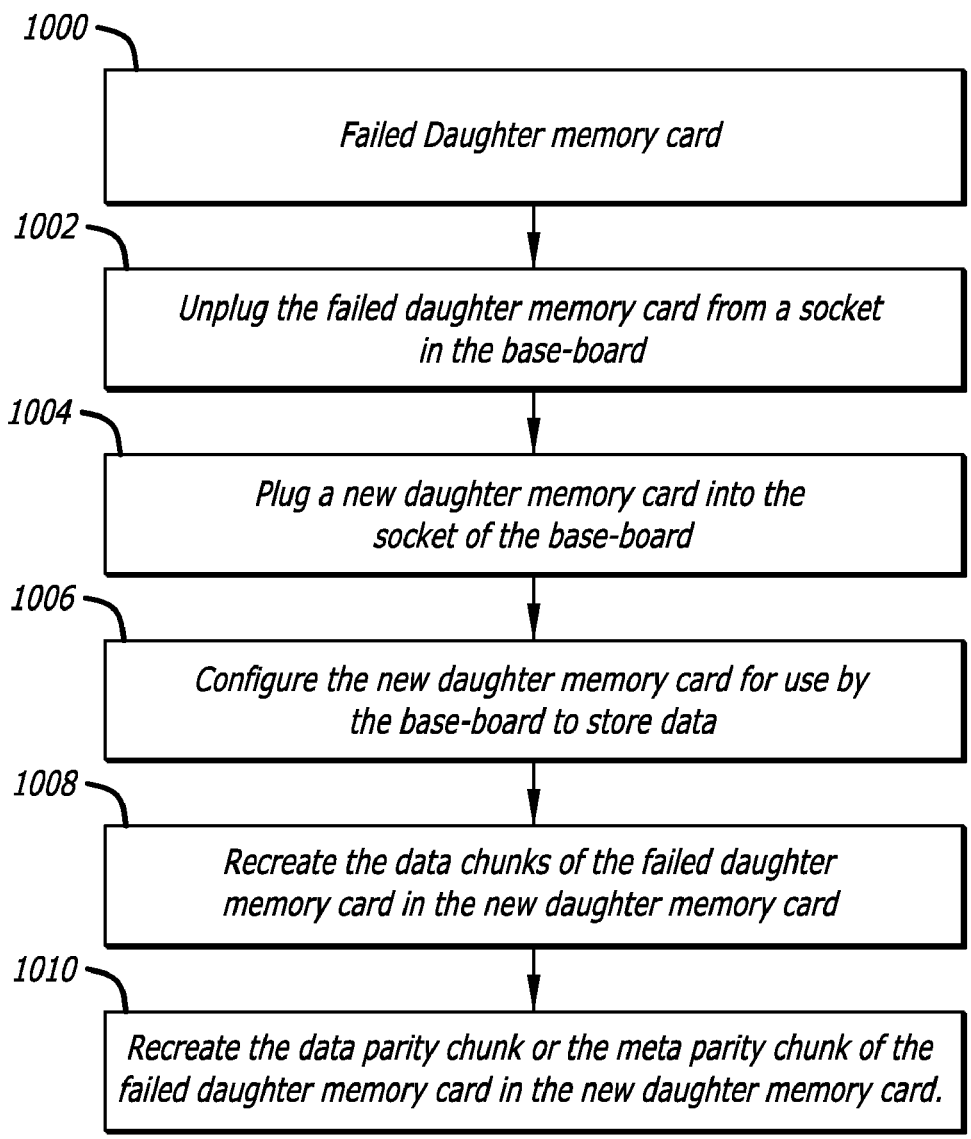
FIG. 10 illustrates a flow chart of a general method for data recovery with redundant data storage in the case of a failed daughter-memory-card.

In FIG. 10, a daughter-memory-card has failed and a method of data recovery with redundant data storage across multiple non-volatile storage devices begins at process block 1000 and then goes to process block 1002.

At process block 1002, the failed daughter-memory-card is unplugged from a socket in a baseboard.

At process block 1004, a new daughter-memory-card is plugged into the socket of the baseboard to replace the failed daughter-memory-card.

At process block 1006, the new daughter-memory-card is configured for use by the baseboard to store data.

At process block 1008, the data chunks of the failed daughter-memory-card are recreated in the new daughter-memory-card.

At process block 1010, the data parity chunk or the meta parity chunk of the failed daughter-memory-card is recreated in the new daughter-memory-card.

Figure 11A:
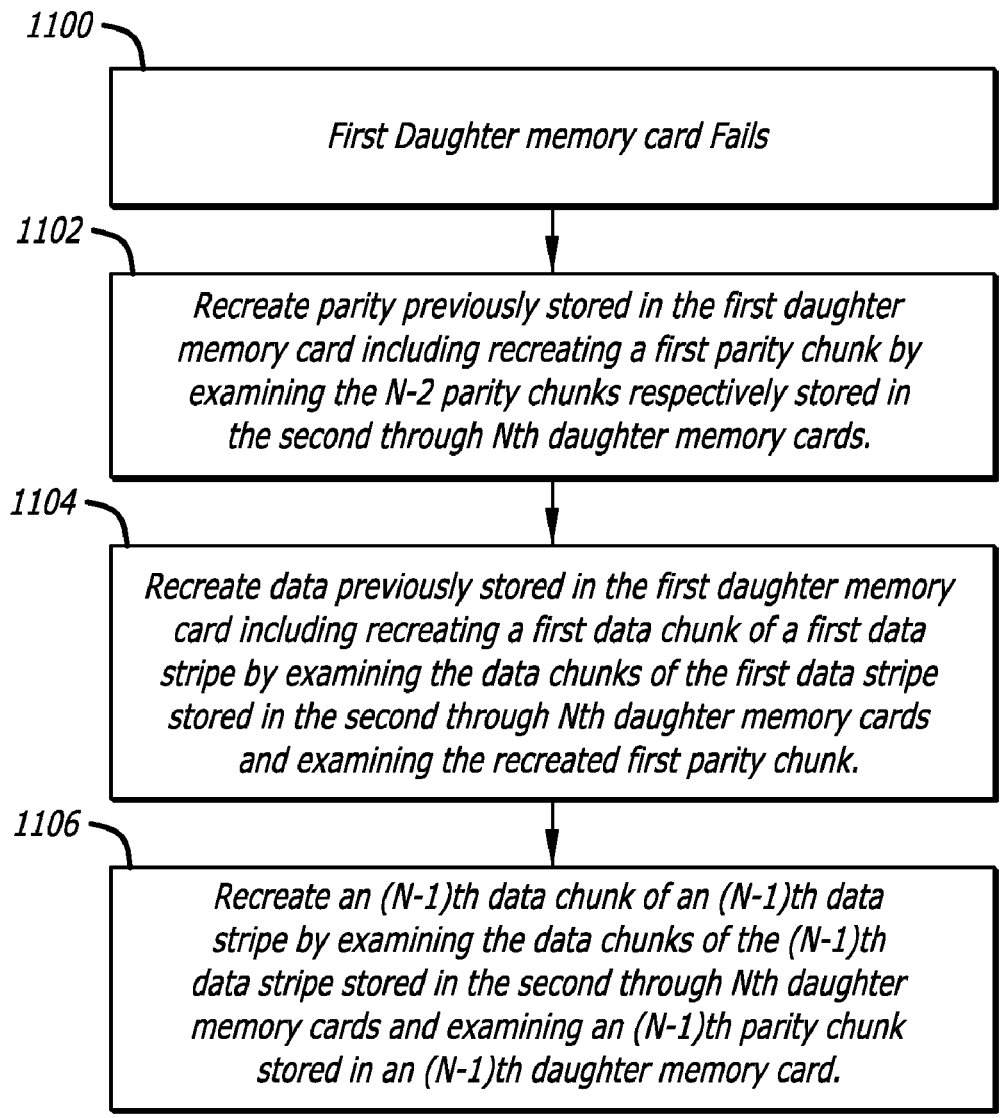
FIG. 11A illustrates a flow chart of a method for data recovery with redundant data storage in the case of a first daughter-memory-card fails amongst N daughter-memory-cards.

In FIG. 11A, a first daughter-memory-card of the N daughter-memory-cards has failed and a method of data recovery with redundant data storage across multiple non-volatile storage devices begins at process block 1100 and the process goes to process block 1102.

At process block 1102, the parity previously stored in the first daughter-memory-card is recreated. A first parity chunk may be recreated by examining the N-2 parity chunks and a meta parity chunk stored in the second through Nth daughter-memory-cards. Note that the parity chunks and the meta parity chunk may be permuted and stored in various combinations across the daughter memory cards. Thus, the first parity chunk recreated for the first daughter memory card may or may not be associated with the first data stripe.

At process block 1104, data previously stored in the first daughter-memory-card is recreated including recreating a first data chunk of a first data stripe by examining the data chunks of the first data stripe stored in the second through Nth daughter-memory-cards and examining a parity chunk in the parity stripe associated with the first data stripe. The parity chunk examined to recreate the first data chunk may be the recreated first parity chunk if it is associated with the first data stripe.

At process block 1106, an (N-1)th data chunk previously stored in the first daughter memory card is recreated for the (N-1)th data stripe. The (N-1)th data chunk is recreated by examining the data chunks of the (N-1)th data stripe stored in the second through Nth daughter-memory-cards and examining an (N-1)th parity chunk stored in an (N-1)th daughter-memory-card.

Figure 11B:
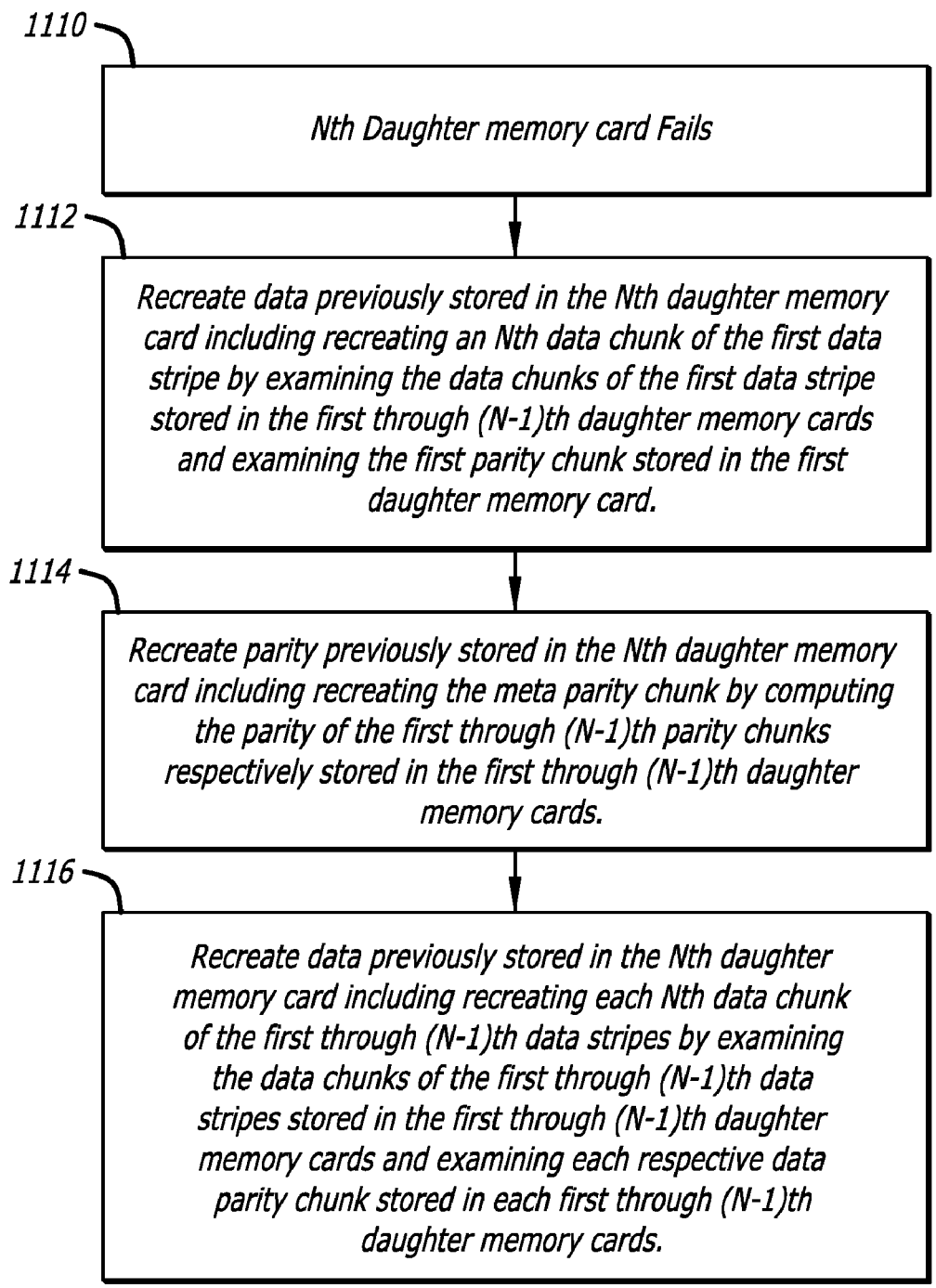
FIG. 11B illustrates a flow chart of a method for data recovery with redundant data storage in the case of an nth daughter-memory-card fails amongst N daughter-memory-cards.

In FIG. 11B, the Nth daughter-memory-card of the N daughter-memory-cards has failed and a method of data recovery with redundant data storage across multiple non-volatile storage devices begins at process block 1100 and the process goes to process block 1112.

At process block 1112, data previously stored in the Nth daughter-memory-card is recreated including recreating an Nth data chunk of the first data stripe by examining the data chunks of the first data stripe stored in the first through (N-1)th daughter-memory-cards and examining the first parity chunk stored in the first daughter-memory-card.

At process block 1114, parity previously stored in the Nth daughter-memory-card is recreated. Note that the parity chunks and the meta parity chunk may be permuted and stored in various combinations across the daughter memory cards. If parity stored in the Nth daughter-memory-card is the meta parity chunk, the meta parity chunk is recreated. The meta parity chunk is recreated by computing the parity of the first through (N-1)th parity chunks respectively stored in the first through (N-1)th daughter-memory-cards that did not fail. If parity stored in the Nth daughter-memory-card is not the meta parity chunk, the parity chunk is recreated by examining the remaining N-2 parity chunks and the meta parity chunk stored in and available from the non failing daughter-memory-cards.

At process block 1116, data previously stored in the Nth daughter-memory-card is recreated including recreating each Nth data chunk of the first through (N-1)th data stripes by examining the data chunks of the first through (N-1)th data stripes stored in the first through (N-1)th daughter-memory-cards and examining each respective data parity chunk stored in each first through (N-1)th daughter-memory-cards.

With the parity and data information recreated in the new daughter-memory-card, it can be utilized to store data in a redundant manner.

This redundant data storage method can be generalized from a plurality of daughter-cards to a plurality of storage devices. Each of the storage devices may be of a similar type and have a similar capacity. Otherwise, the performance of the redundant data storage method is limited by slower storage devices and storage devices with lower storage capacity. Each of the storage devices may be replaced when failure occurs. For example, each storage device may be a re-writable storage disk. Alternatively, each storage device may be a hard drive with a plurality of re-writeable storage disks. In any case, chunks of data may be stored in data stripes across the storage disks.

In one embodiment, data redundancy is provided across four storage devices. A collection of twelve data chunks is stored in three data stripes of data across four storage devices including a first data stripe, a second data stripe, and a third data stripe. Each data chunk forming a data stripe is stored in a different storage device. A parity stripe is stored across the four storage devices including a first parity chunk, a second parity chunk, a third parity chunk, and a fourth parity chunk. A first storage device of the four storage devices stores the first parity chunk computed as parity of four data chunks forming the first data stripe. A second storage device of the four storage devices stores the second parity chunk computed as parity of four data chunks forming the second data stripe. A third storage device of the four storage devices stores the third parity chunk computed as parity of four data chunks forming the third data stripe. A fourth storage device of the four storage devices further stores the fourth parity chunk computed as parity of the first parity chunk, second parity chunk and the third parity chunk.

Data in the data stripe is read out across the four storage devices and checked for errors. For example, the first data stripe of data can read out across the four storage devices. The first parity chunk can be read from the parity stripe in response to reading the first data stripe. A first computed parity can be computed for the four data chunks forming the first data stripe read. The first computed parity can be compared with the first parity chunk to determine if any of the storage devices have failed. Instead of the parity stripe being used to check errors, ECC information may be used with the parity stripe being used for data recovery in the case of a faulty storage device.

Alternately, some embodiments of the invention may store error correction code (ECC) information associated with each data chunk in the stripe. The ECC information may be used to determine whether or not any of the storage devices have failed without having to separately read the parity stripe. This may be an advantage because the full read bandwidth of the collection of storage devices is available to the data read, but relies on the assumption that each chunk of a data stripe can be independently validated.

The ECC information associated with each chunk (which is stored in the ECC area of the write page) is used for validation. If the ECC checks out, then the data chunk is valid. If the ECC is validated for all data chunks within a data stripe, then the data stripe is valid. No further parity verification of a read of the data chunks or the data stripe in which it is stored is required.

If the first storage device has failed, the parity may first be recreated and then the data may be recreated. In recreating parity previously stored in the storage device, the first parity chunk is recreated by examining the second, third, and fourth parity chunks respectively stored in the second, third, and fourth storage devices. In recreating data previously stored in the first storage device, a first data chunk of the first data stripe is recreated by examining the data chunks of the first data stripe stored in the second, third, and fourth storage devices and examining the recreated first parity chunk. A second data chunk of the second data stripe can be recreated by examining the data chunks of the second data stripe stored in the second, third, and fourth storage devices and examining the second parity chunk stored in the second storage device. A third data chunk of the third data stripe can be recreated by examining the data chunks of the third data stripe stored in the second, third, and fourth storage devices and examining the third parity chunk stored in the third storage device.

If a fourth storage device of the four storage devices has failed, it can also be regenerated. Data previously stored in the fourth storage device can be recreated by recreating a fourth data chunk of the first data stripe, the second data stripe, and the third data stripe. The fourth data chunk of the first data stripe can be recreated by examining the data chunks of the first data stripe stored in the first, second, and third storage devices and examining the first parity chunk stored in the first storage device. The fourth data chunk of the second data stripe can be recreated by examining the data chunks of the second data stripe stored in the first, second, and third storage devices and examining the second parity chunk stored in the second storage device. The fourth data chunk of the third data stripe can be recreated by examining the data chunks of the third data stripe stored in the first, second, and third storage devices and examining the third parity chunk stored in the third storage device.

Parity previously stored in the fourth storage device can be recreated by recreating the fourth parity chunk by computing the parity of the first, second, and third parity chunks respectively stored in the first, second, and third storage devices.

In another embodiment, a collection of data chunks is stored as a plurality of N-1 data stripes across N storage devices, with N being a predetermined variable of three or more. Each data chunk of up to N data chunks that form a data stripe are stored in a different storage device. A parity stripe is stored across the N storage devices, The parity stripe includes N-1 data parity chunks and one meta data parity chunk. Each Kth storage device of N-1 storage devices stores a Kth data parity chunk of the N-1 data parity chunks computed as parity of up to N data chunks forming the Kth data stripe. The Nth storage device of the N storage devices stores the meta parity chunk computed as parity of the N-1 data parity chunks stored in the respective N-1 storage devices.

Normally data is read from and written into a given data stripe of the N-1 data stripes across the N storage devices. During each write, parity is computed and stored in the parity stripe. During each read, parity is checked for a read error. For example, the first data stripe of data is read out across the N storage devices. A first data parity chunk is read from the parity stripe in response to reading the first data stripe. A first computed parity is computed from the data chunks forming the first data stripe that was read out across the N storage devices. The first computed parity is compared against the first data parity chunk that was read out from the parity stripe. If there is a difference detected between the two values by the comparison, a data error has occurred. Alternately, some embodiments of the invention may store ECC information associated with each data chunk in the stripe, and use this information to determine whether or not any of the storage devices have failed without having to separately read the parity stripe. The data error may be a soft data error due to a random event or a hard data error that is constant indicating a possible hardware failure at that location, area, or the storage device as a whole. If only a few bits are in error, the error may be recoverable with an error correction code. However, if significant portions of the storage device are failing or if it needs replacing for whatever reason, the storage device may considered to have failed.

If a first storage device of N storage devices has failed, parity previously stored in the first storage device can be recreated. A first parity chunk is recreated by examining the N-2 parity chunks respectively stored in the second through Nth storage devices. Data previously stored in the first storage device can also be recreated. A first data chunk of the first data stripe can be recreated by examining the data chunks of the first data stripe stored in the second through Nth storage devices (that have not failed) and examining the recreated first parity chunk. Generalizing for the remaining data chunks in each data stripe of the first storage device, the (N-1)th data chunk of the (N-1)th data stripe can be recreated by examining the data chunks of the (N-1)th data stripe stored in the second through Nth storage devices and examining an (N-1)th parity chunk stored in an (N-1)th storage device.

To generalize where the Nth storage device has failed, data previously stored in the Nth storage device can be recreated. An Nth data chunk of the first through (N-1)th data stripes is recreated by examining the data chunks of the first through (N-1)th data stripes stored in the first through (N-1)th storage devices and examining each respective parity chunk stored in each of the first through (n-1)th storage devices. Parity previously stored in the Nth storage device can be recreated. The Nth parity chunk is recreated by computing the parity of the first through (N-1)th parity chunks respectively stored in the first through (N-1)th storage devices.

If a storage device between the first and Nth fails, the method of recreating data and parity for the given storage device can be readily ascertained from the description of the first and the Nth storage device failures. The label of the failing device may also be re-arranged so that it is the first storage device that fails and the description of recreating data and parity for the first storage device is applicable.

CONCLUSION

Aspects of embodiments of the invention are thus described. Aspects of the invention may be implemented in a system using software and/or hardware. For example, a system may include one or more processors that execute instructions of software to implement an aspect of the invention. A process may be performed by instructions with a processor.

When implemented in software, the elements of the embodiments of the invention are essentially the code segments or instructions to perform the necessary tasks. The program or code segments can be stored in a processor readable medium. The processor readable medium may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, or other type of storage device. The code segments or instructions may be remotely stored and downloaded in a data signal via computer networks such as the Internet, Intranet, etc. over a fiber optic medium, a radio frequency (RF) link, or other transmission medium for execution by a processor.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The embodiments of the invention should be construed according to the claims that follow below.

What is claimed is:

1. A method for data redundancy across three or more storage devices, the method comprising:
   storing a collection of data chunks as a plurality of N-1 data stripes across N storage devices where N is three or more, wherein each data chunk of up to N data chunks forming a data stripe is stored in a different storage device;
   storing a parity stripe across the N storage devices including N-1 data parity chunks and one meta data parity chunk;
   wherein each Kth storage device of N-1 storage devices stores a Kth data parity chunk of the N-1 data parity chunks computed as parity of up to N data chunks forming the Kth data stripe; and
   wherein an Nth storage device of the N storage devices stores the meta parity chunk computed as parity of the N-1 data parity chunks stored in the respective N-1 storage devices.

2. The method of claim 1, further comprising:
   reading the first data stripe of data across the N storage devices.

3. The method of claim 2, further comprising:
   reading the first data parity chunk from the parity stripe in response to reading the first data stripe;
   computing a first computed parity of the data chunks forming the first data stripe read across the N storage devices; and
   comparing the first computed parity with the first data parity chunk.

4. The method of claim 1, wherein a first storage device has failed and the method further comprises:
   recreating parity previously stored in the first storage device including
      recreating a first parity chunk by examining the N-2 parity chunks respectively stored in the second through Nth storage devices.

5. The method of claim 4, further comprises:
   recreating data previously stored in the first storage device including
      recreating a first data chunk of a first data stripe by examining the data chunks of the first data stripe stored in the second through Nth storage devices and examining the recreated first parity chunk.

6. The method of claim 5, further comprises:
recreating an (N-1)th data chunk of an (N-1)th data stripe by examining the data chunks of the (N-1)th data stripe stored in the second through Nth storage devices and examining an (N-1)th parity chunk stored in an (N-1)th storage device.

7. The method of claim 1, wherein the Nth storage device has failed and the method further comprises:
recreating data previously stored in the Nth storage device including
recreating an Nth data chunk of the first data stripe by examining the data chunks of the first data stripe stored in the first through (N-1)th storage devices and examining the first parity chunk stored in the first storage device.

8. The method of claim 1, wherein the Nth storage device has failed and the method further comprises:
recreating parity previously stored in the Nth storage device including
recreating the Nth parity chunk by computing the parity of the first through (N-1)th parity chunks respectively stored in the first through (N-1)th storage devices.

9. The method of claim 8, further comprises:
recreating data previously stored in the Nth storage device including
recreating an Nth data chunk of the first through (N-1)th data stripes by examining the data chunks of
the first through (N-1)th data stripes stored in the first through (N-1)th storage devices and examining each respective parity chunk stored in each of the first through (N-1)th storage devices.

10. A method for data redundancy across four storage devices, the method comprising:
storing a collection of twelve data chunks in three data stripes of data across four storage devices including a first data stripe, a second data stripe, and a third data stripe, wherein each data chunk forming a data stripe is stored in a different storage device;
storing a parity stripe across the four storage devices including a first parity chunk, a second parity chunk, a third parity chunk, and a fourth parity chunk;
wherein a first storage device of the four storage devices stores the first parity chunk computed as parity of four data chunks forming the first data stripe;
wherein a second storage device of the four storage devices stores the second parity chunk computed as parity of four data chunks forming the second data stripe;
wherein a third storage device of the four storage devices stores the third parity chunk computed as parity of four data chunks forming the third data stripe; and
wherein a fourth storage device of the four storage devices further stores the fourth parity chunk computed as parity of the first parity chunk, second parity chunk and the third parity chunk.

11. The method of claim 10, further comprising:
reading the first data stripe of data across the four storage devices.

12. The method of claim 11, further comprises:
reading the first parity chunk from the parity stripe in response to reading the first data stripe;
computing a first computed parity of the four data chunks forming the first data stripe read; and
comparing the first computed parity with the first parity chunk.

13. The method of claim 10, wherein the first storage device has failed and the method further comprises:
recreating parity previously stored in the first storage device including
recreating the first parity chunk by examining the second, third, and fourth parity chunks respectively stored in the second, third, and fourth storage devices.

14. The method of claim 13, further comprises:
recreating data previously stored in the first storage device including
recreating a first data chunk of the first data stripe by examining the data chunks of the first data stripe stored in the second, third, and fourth storage devices and examining the recreated first parity chunk.

15. The method of claim 14, further comprises:
recreating a second data chunk of the second data stripe by examining the data chunks of the second data stripe stored in the second, third, and fourth storage devices and examining the second parity chunk stored in the second storage device; and
recreating a third data chunk of the third data stripe by examining the data chunks of the third data stripe stored in the second, third, and fourth storage devices and examining the third parity chunk stored in the third storage device.

16. The method of claim 10, wherein the fourth storage device has failed and the method further comprises:
recreating data previously stored in the fourth storage device including
recreating a fourth data chunk of the first data stripe by examining the data chunks of the first data stripe stored in the first, second, and third storage devices and examining the first parity chunk stored in the first storage device.

17. The method of claim 10, wherein the fourth storage device has failed and the method further comprises:
recreating parity previously stored in the fourth storage device including
recreating the fourth parity chunk by computing the parity of the first, second, and third parity chunks respectively stored in the first, second, and third storage devices.

18. The method of claim 17, further comprises:
recreating data previously stored in the fourth storage device including
recreating a fourth data chunk of the first data stripe by examining the data chunks of the first data stripe stored in the first, second, and third storage devices and examining the first parity chunk stored in the first storage device;
recreating a fourth data chunk of the second data stripe by examining the data chunks of the second data stripe stored in the first, second, and third storage devices and examining the second parity chunk stored in the second storage device; and
recreating a fourth data chunk of the third data stripe by examining the data chunks of the third data stripe stored in the first, second, and third storage devices and examining the third parity chunk stored in the third storage device.

19. A method for data redundancy across multiple storage devices, the method comprising:
- storing a collection of data chunks as a plurality of N-1 data stripes across N daughter boards including non-volatile memory, where N is three or more, wherein each data chunk of up to N data chunks forming a data stripe is stored in a different daughter board;
- storing a parity stripe across the N daughter boards including N-1 data parity chunks and one meta data parity chunk;
- wherein each Kth daughter board of N-1 daughter boards stores a Kth data parity chunk of the N-1 parity chunks computed as parity of up to N data chunks forming the Kth data stripe; and
- wherein an Nth daughter board of the N daughter boards stores the meta parity chunk computed as parity of the N-1 data parity chunks stored in the respective N-1 daughter boards.

20. The method of claim 19, further comprising:
- reading a first data stripe of data across the N daughter boards.

21. The method of claim 20, further comprising:
- reading the first data parity chunk from the parity stripe in response to reading the first data stripe;
- computing a first computed parity of the N-1 data chunks forming the first data stripe read; and
- comparing the first computed parity with the first data parity chunk.

22. The method of claim 20, wherein
the N-1 data chunks and the one data parity chunk or meta parity chunk in a daughter board collectively has a size of one write page into non-volatile memory.

23. The method of claim 22, wherein
the write page size is four kilobytes.

24. The method of claim 19, further comprising:
- invalidating a data chunk in a data stripe by
  - marking a data chunk in a data stripe invalid; and
  - retaining the previous data in the data chunk for data redundancy until all data chunks in the data stripe are invalid.

25. The method of claim 22, wherein a daughter board has failed and the method further comprises:
- unplugging the failed daughter board from a socket in a base board;
- plugging a new daughter board into the socket of the base board;
- configuring the new daughter board for use within the base board;
- recreating the data chunks of the failed daughter board in the new daughter board; and
- recreating the data parity chunk or the meta parity chunk of the failed daughter board in the new daughter board.

* * * * *